(12) United States Patent
Chen et al.

(10) Patent No.: US 12,145,311 B2
(45) Date of Patent: Nov. 19, 2024

(54) CURING-ON-DEMAND PRINTHEADS FOR MULTI-MATERIAL 3D PRINTING

(71) Applicant: UNIVERSITY OF SOUTHERN CALIFORNIA, Los Angeles, CA (US)

(72) Inventors: Yong Chen, Los Angeles, CA (US); Huachao Mao, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 124 days.

(21) Appl. No.: 17/504,169

(22) Filed: Oct. 18, 2021

(65) Prior Publication Data

US 2022/0118692 A1 Apr. 21, 2022

Related U.S. Application Data

(60) Provisional application No. 63/094,010, filed on Oct. 20, 2020.

(51) Int. Cl.

| | | |
|---|---|---|
| *B29C 64/135* | (2017.01) | |
| *B29C 64/209* | (2017.01) | |
| *B29C 64/232* | (2017.01) | |
| *B29C 64/236* | (2017.01) | |
| *B29C 64/245* | (2017.01) | |
| *B29C 64/25* | (2017.01) | |

(Continued)

(52) U.S. Cl.
CPC .......... *B29C 64/135* (2017.08); *B29C 64/209* (2017.08); *B29C 64/232* (2017.08); *B29C 64/236* (2017.08); *B29C 64/245* (2017.08); *B29C 64/25* (2017.08); *B29C 64/255* (2017.08); *B29C 64/268* (2017.08); *B29C 64/286* (2017.08); *B29C 64/336* (2017.08); *B29C 64/35* (2017.08); *B33Y 10/00* (2014.12); *B33Y 30/00* (2014.12); *B33Y 40/00* (2014.12)

(58) Field of Classification Search
CPC ... B29C 64/124; B29C 64/135; B29C 64/209; B29C 64/232; B29C 64/236; B29C 64/245; B29C 64/255; B29C 64/268; B29C 64/286; B29C 64/336; B29C 64/35; B29C 64/129; B29C 64/357; B29C 64/277; B29C 64/25; B33Y 10/00; B33Y 30/00; B33Y 40/00
See application file for complete search history.

(56) References Cited

U.S. PATENT DOCUMENTS

2016/0368210 A1* 12/2016 Chen .................. B29C 64/124
2017/0246797 A1* 8/2017 Lambrecht ............ B29C 64/40

FOREIGN PATENT DOCUMENTS

WO WO-2018208799 A1 * 11/2018 ........... B29C 64/124

* cited by examiner

*Primary Examiner* — Philip C Tucker
*Assistant Examiner* — Jimmy R Smith, Jr.
(74) *Attorney, Agent, or Firm* — Snell & Wilmer LLP

(57) ABSTRACT

A method of multi-material 3D printing is performed by an apparatus comprising at least one printhead device; a build platform; a light source; and a computing unit comprising a non-transitory computer-readable medium encoded with program instructions for controlling the at least one printhead device; the build platform; and the light source to perform the method of multi-material 3D printing. In various embodiments, each printhead device comprises a coating section, a curing section, a cleaning section, and optionally, a post-curing section. Each printhead device is configured to perform each of these steps, with the multiple printheads engaged in fabricating a multi-material part layer-by-layer.

21 Claims, 26 Drawing Sheets
(7 of 26 Drawing Sheet(s) Filed in Color)

(51) Int. Cl.
*B29C 64/255* (2017.01)
*B29C 64/268* (2017.01)
*B29C 64/286* (2017.01)
*B29C 64/336* (2017.01)
*B29C 64/35* (2017.01)
*B33Y 10/00* (2015.01)
*B33Y 30/00* (2015.01)
*B33Y 40/00* (2020.01)

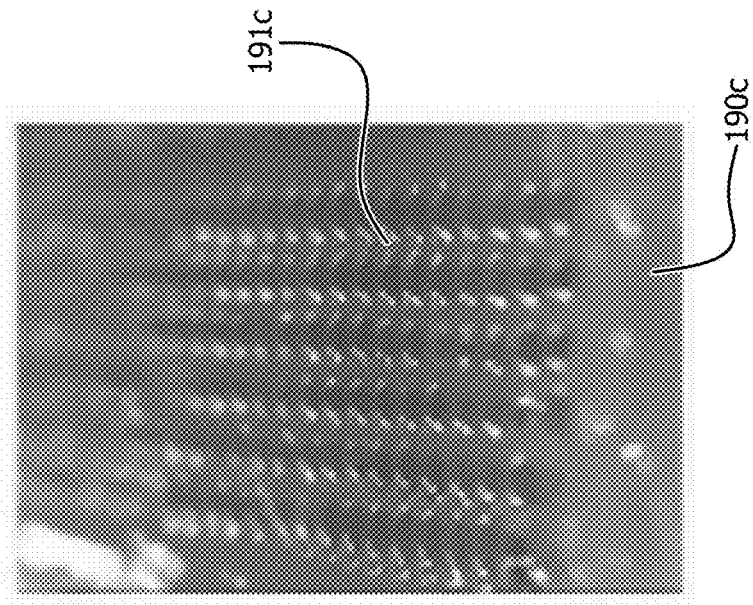
FIG. 19B3
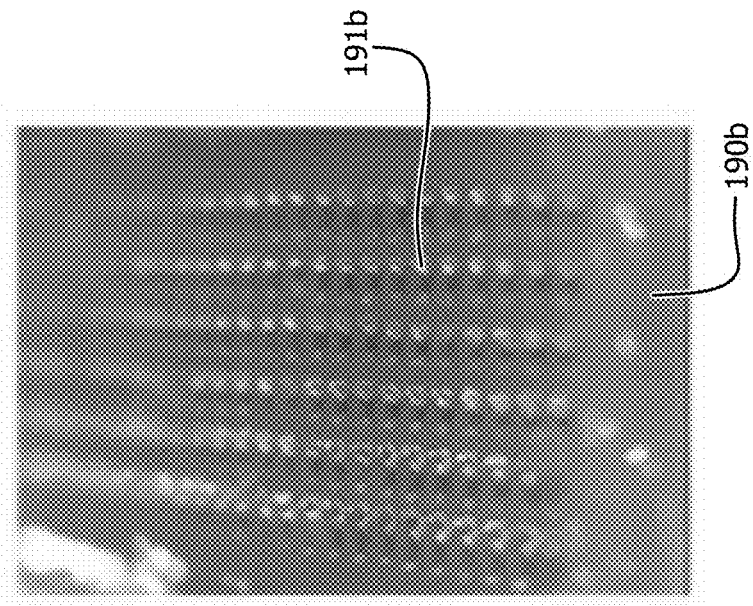
FIG. 19B2
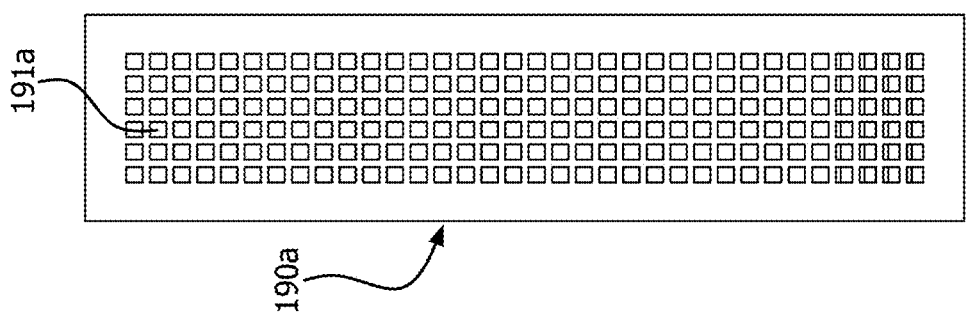
FIG. 19B1

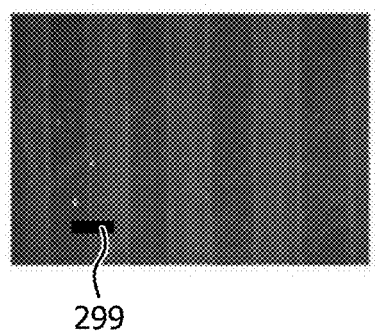
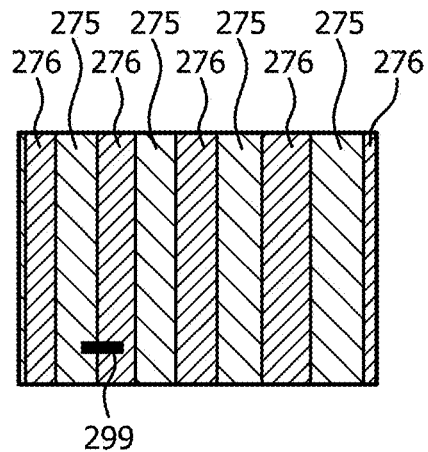
FIG. 20A1      FIG. 20A2
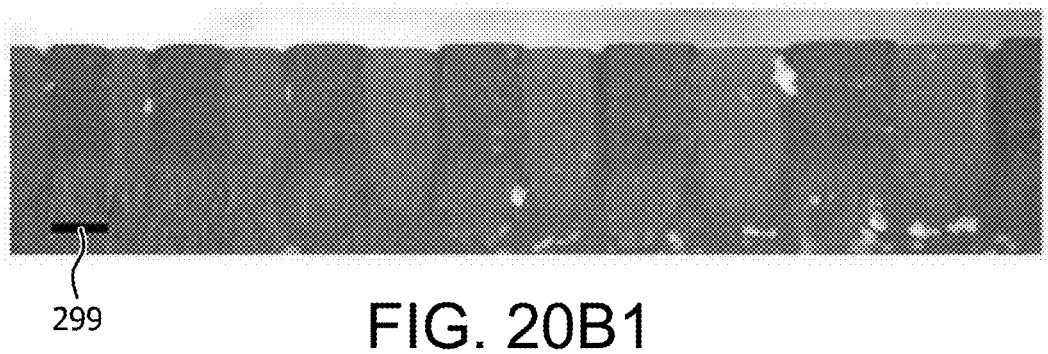
FIG. 20B1
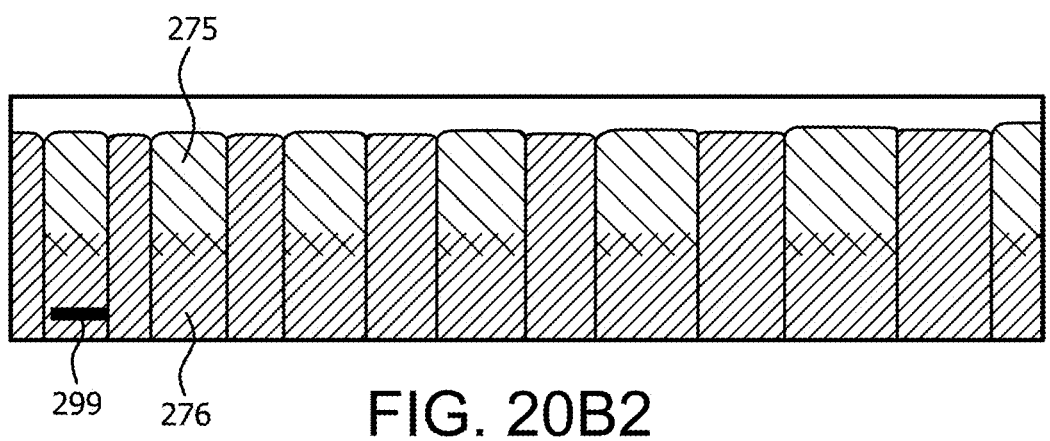
FIG. 20B2

CURING-ON-DEMAND PRINTHEADS FOR MULTI-MATERIAL 3D PRINTING

CROSS-REFERENCE TO RELATED APPLICATIONS

This application claims priority to, and the benefit of, U.S. Provisional Patent Application Ser. No. 63/094,010 filed Oct. 20, 2020 and entitled CURING-ON-DEMAND PRINTHEADS FOR MULTI-MATERIAL 3D PRINTING, the disclosure of which is incorporated herein by reference in its entirety for all purposes.

STATEMENT REGARDING FEDERALLY SPONSORED RESEARCH

This invention was made with government support under National Science Foundation (NSF) grant CMMI-1151191. The government has certain rights in the invention

FIELD

The present disclosure generally relates to 3D printing devices and processes, and in particular to curing-on-demand printheads, apparatuses comprising multiple printheads, and systems and processes for multi-material 3D printing.

BACKGROUND

Enormous demands for multi-material three-dimensional ("3D") printing exist in widely diverse fields such as academic and industrial research and development, industry fabrication, medicine, education, and entertainment. To meet these demands, many multi-material 3D printing methods and systems have been developed. In general, multi-material 3D printing processes are characterizable as being either deposition-on-demand ("DOD") or curing-on-demand ("COD") processes.

For example, multi jetting deposition modeling ("MJM") has been used to fabricate 3D objects with multiple types of polymers and polymer-derived materials. In the MJM process, a piezoelectric material is used in the printhead to generate a pressure pulse in the fluid, forcing a droplet of ink out from the microscale nozzles. Such a DOD method jets different material droplets from an array of nozzles to fabricate a 3D multi-material object. However, this and other DOD-based methods of 3D printing having two main drawbacks. First, these methods are amenable only to liquid resins having low viscosity because viscous materials cannot be jetted from the microscale nozzles. Secondly, the methods have limited reliability due to a large number of nozzles required and their microscale sizes. Further, configuring a DOD method for higher resolution requires smaller nozzle size, leading to less reliability, higher costs, and fewer compatible material choices.

Besides MJM, multi-nozzle fusion deposition modeling ("FDM") has also been widely used, primarily due to its low cost. FDM utilizes multiple nozzles to extrude different filament materials and fuse the filaments into a component comprising multiple materials. However, FDM is applicable only for thermosensitive materials, such as ABS and PLA, notably excluding more common curable polymers and polymer-derived materials. In addition, FDM printers have limited fabrication speed and resulting surface quality. A variation of FDM, known as multi-syringes deposition ("MSD"), comprises a natural way to deposit soft materials, thus finding use when soft printed parts are desired.

The aforementioned 3D printing processes share the same characteristics. Namely, they use nozzles of different sizes to deposit materials to the demanded area only. The differences between MJM, FDM and MSD is primarily how the material is deposited out of the nozzles. A user of these processes needs to make certain tradeoffs between material deposition rate, resolution of printed features, and materials.

In comparison, another widely used additive manufacturing ("AM") method, termed stereolithography ("SL"), cures photo-curable resin at designated positions using a controlled energy input, otherwise known as COD. The SL process has become an increasingly promising AM process since it was first introduced in 1986, primarily due to its high resolution, fast fabrication, and ability to process extensive material choices. Unlike the DOD methods, COD methods deposit one material on an entire layer, regardless of design shape, then selectively solidify the material in the area on-demand, and finally clean the unsolidified liquid resin to prepare for a switch to another material. This process of deposition and cleaning is repeated for each of the materials to be printed.

Such a COD process, depositing an entire layer of resin and cleaning the uncured material afterwards, presents different tradeoffs amongst material deposition rate, resolution of printed features, and compatible materials. A critical challenge in the COD multi-material SL process is to avoid mixing and contamination between different liquid resins used in the fabrication process. Pervious research on multi-material SL processes mostly focused on the top-down-based projection. But since the entire part is immersed in liquid resin in this process, it is generally difficult to wash and clean the entire printed part prior to switching the platform to another liquid resin vat. Each step involving cleaning of the entire part results in material waste and slow printing.

In comparison, a bottom-up-based multi-material SL process uses two vats to contain two different liquid resins, and prior to swapping between the two, the uncured resin is cleaned using a brush and an ultrasonic cleaner. A variation of this method features two vats with different liquid resins that are automatically exchanged to fabricate a part with the two materials. In general, bottom-up-based multi-material SL processes require relatively shallow vats of liquid resin, and hence the printed part is immersed in the resin within a limited depth. The remaining uncured resin is significantly reduced to only a few millimeters. Some recent work used dynamic fluidic control of multiple liquid photopolymers for micro-stereolithography. But regardless, the process still requires significant effort and long time periods to clean uncured resin. Further, there remains the unmet need to make the coated resin significantly shallower, e.g., in the range of about 100 µm) such that a more efficient and effecting cleaning is achievable.

In summary, the two available technologies in the market for multi-material printing, namely FDM and MJM utilize extrusion-on-demand and droplet-on-demand technologies, respectively. Although these methods can deposit a demanded amount of material into the correct position desired, there are serious limitations to these processes.

In view of these and other shortcomings seen in multi-material 3D printing methods, new processes are clearly needed. Ideally, new multi-material 3D printing methods should address the challenges seen in coating different materials at desired positions of a part, and avoiding contamination between different materials.

SUMMARY

In accordance with various embodiments of the present disclosure, a multi-material additive manufacturing (AM) process has been developed, comprising a curing-on-demand (COD) method to fabricate a three-dimensional (3D) object having multiple material compositions.

In various embodiments, a multi-material stereolithography (SL) process according to the present disclosure enables 3D printing of components using more viscous materials, and achieves desired manufacturing characteristics such as high feature resolution, fast fabrication speeds and low machine cost.

Unlike a deposition-on-demand printing method, the curing-on-demand printhead devices herein utilize a digital light processing (DLP) projector to selectively cure a thin layer of liquid photocurable resin and then clean the residual uncured material effectively using a vacuuming and post-curing feature. Each printhead device individually fabricates one type of material using digitally controlled mask image patterns. By combining multiple curing-on-demand printheads together, the disclosed AM process accurately deposits multiple materials in each layer of the part being printed. Consequently, a 3D object is fabricated layer-by-layer using the curing-on-demand printing method of the present disclosure.

In various embodiments, a device, apparatus, process and system are described for fabricating 3D objects with multiple materials.

In accordance with various embodiments of the present disclosure, a multi-material printing apparatus comprises multiple COD printhead devices, each providing multi-material coating and resin cleaning, thus eliminating any possibility of material contamination.

In various embodiments, a 3D printing process in accordance with the present disclosure overcomes the technological deficiencies in existing multi-material SL processes, reducing the coated resin to sub-millimeter levels that are comparable in scale to printed layer thicknesses.

In various embodiments, a printhead in accordance with the present disclosure is configured to execute a 3D printing process referred to herein as "coating, curing, cleaning, and post-curing (or "C3P"). A printhead in accordance with the present disclosure increases printing efficiency, enhances resin cleaning efficiency, and eliminates contamination between materials in multi-material printing.

In various embodiments, a printhead in accordance with the present disclosure comprises a vacuum-cleaning portion configured for uncured resin removal from the part and the printhead. Due in part to its compact design, the COD printheads of the current disclosure are capable of coating a thin layer of resin, solidifying the resin with a single mask image exposure, and eliminating material contamination due to residual resin.

In various embodiments, the C3P method comprises a step of cleaning uncured resin subsequent to a selective curing step. Stated another way, an important aspect of the C3P process herein is the effective cleaning of uncured resin right after the step of selective photocuring. In various aspects, an entire layer of liquid resin is uniformly coated and then selectively photocured using computed sliced mask image patterns based on an input 3D model. Subsequently, uncured liquid resin is immediately cleaned up by vacuum, and any residual resin then further photocured to avoid any potential contamination with other materials. The printheads herein are configured to void uncured resin under vacuum by engaging a vacuum-cleaning portion of the printhead.

In various embodiments, the C3P method disclosed herein enables multi-material printing with more material choices, and achieves desirable manufacturing characteristics such as high feature resolution, fast fabrication speed and low machine cost.

In various embodiments, a printhead device configured for use in a multi-material 3D printing apparatus comprises: a coating section comprising a top surface having at least one opening configured to dispense a liquid resin therefrom when the liquid resin is placed under fluidic pressure; a curing section comprising a top surface transparent to at least one of UV, infrared or visible light; and a cleaning section comprising a top surface having at least one opening configured to intake the liquid resin when the at least one opening is placed under vacuum.

In various embodiments, the printhead device further comprises a post-curing section comprising a top surface transparent to at least one of UV, infrared or visible light.

In various embodiments, the top surface of the coating section comprises a plurality of holes, each hole configured to dispense the liquid resin therefrom when the liquid resin is placed under fluidic pressure.

In various embodiments, each hole measures about 0.5 mm$^2$, with the holes in the plurality of holes uniformly spaced apart.

In various embodiments, each hole is configured to exude the liquid resin to a height from about 0.05 mm to about 1.5 mm when the liquid resin is placed under fluidic pressure.

In various embodiments, the coating section further comprises a reservoir configured to contain the liquid resin placed under fluidic pressure.

In various embodiments, the top surface of the cleaning section comprises at least one elongated vacuum slot.

In various embodiments, the top surface of the cleaning section comprises two or more elongated and parallel configured vacuum slots having sequentially narrowing widths.

In various embodiments, the top surfaces of the coating section, the curing section, and the cleaning section are coplanar, such as comprising a single contiguous machined surface or separate top surfaces that are aligned to be coplanar.

In various embodiments, an apparatus for multi-material 3D printing of an object comprises: at least one printhead device configured to move along an x-axis; a build platform configured to move the object being printed in a z-direction towards and away from the at least one printhead device; a light source configured to project through the printhead device and cure a curable material applied to the build platform or to the object being printed; and a computing unit comprising a non-transitory computer-readable medium encoded with program instructions for controlling the at least one printhead device; the build platform; and the light source to perform a method of multi-material 3D printing, wherein each printhead device comprises a coating section comprising a top surface having at least one opening configured to dispense a curable material therefrom when the curable material is placed under fluidic pressure; a curing section comprising a top surface transparent to at least one of UV, infrared or visible light; and a cleaning section comprising a top surface having at least one opening configured to intake the curable material when the at least one opening is placed under a reduced pressure.

In various embodiments, the light source is part of an optics system controlled by the program instructions.

In various embodiments, the method of multi-material 3D printing performed by the apparatus comprises a bottom-up or top-down, deposition-on-demand (DOD), layer-by-layer stereolithographic printing of the object with the curable material.

In various embodiments, each of the at least one printhead devices is configured for: applying a layer of the curable material to the build platform or onto a layer of cured material on the object being printed; curing the layer of curable material thus applied; and cleaning off remaining uncured material on the object by a vacuum-cleaning process, after the step of curing.

In various embodiments, each printhead device further comprises a post-cure section comprising a top surface transparent to at least one of UV, infrared or visible light.

In various embodiments, at least two printhead devices are mounted on a multistage platform configured to move the at least two printhead devices in unison, wherein the movement is controlled by the program instructions, and wherein the movement comprises registration of each of one of the coating, curing, and cleaning sections of each printhead device underneath the object being printed.

In various embodiments, the apparatus further comprises a fluidic pump connected to the printhead device, configured to provide the curable material under pressure to the at least one opening configured in the top of the coating section of the printhead device, wherein the fluidic pump is controlled by the program instructions.

In various embodiments, the apparatus further comprises a vacuum source, such as a vacuum pump or vacuum system, connected to the at least one opening configured in the top of the cleaning section of the printhead device, configured to place the at least one opening under a reduced air pressure, wherein the vacuum source is controlled by the program instructions.

In various embodiments, a method of multi-material 3D printing of an object comprises: coating a layer of a curable material from a coating section of a printhead device onto a build platform of a multi-material 3D printing apparatus or onto the object being printed on the build platform, the multi-material 3D printing apparatus comprising: multiple printhead devices configured to move along an x-axis; the build platform configured to move the object being printed in a z-direction toward and away from each printhead device; a light source configured to cure the curable material through each printhead device; and a computing unit comprising a non-transitory computer-readable medium encoded with program instructions for controlling the multiple printhead devices, the build platform, and the light source to perform the method of multi-material 3D printing; curing the layer of curable material thus applied with the light source; cleaning uncured material remaining on the object after the step of curing; and optionally repeating each of the coating, curing and cleaning steps with the same or different printhead device, and with the same or different curable material, until the object is printed layer-by-layer.

In various embodiments, the step of cleaning uncured material remaining on the object comprises a vacuum-cleaning process performed by a cleaning section of the printhead device, the cleaning section comprising at least one vacuum slot placed under a negative pressure such as provided by a vacuum pump or other negative pressure system.

In various embodiments, the step of curing comprises a digital micromirror device (DMD), liquid crystal display, or scanning-mirror-based laser controlled by the program instructions to provide controlled light from the light source, wherein the controlled light cures the layer of curable material from a liquid state into a solid state in the shape of a sliced layer. The sliced layer may be obtained, for example, from slicing software applied to a CAD drawing of the object to be printed.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

The subject matter of the present disclosure is pointed out with particularity and claimed distinctly in the concluding portion of the specification. A more complete understanding, however, may best be obtained by referring to the detailed description and claims when considered in connection with the following drawing figures:

Figure 1:
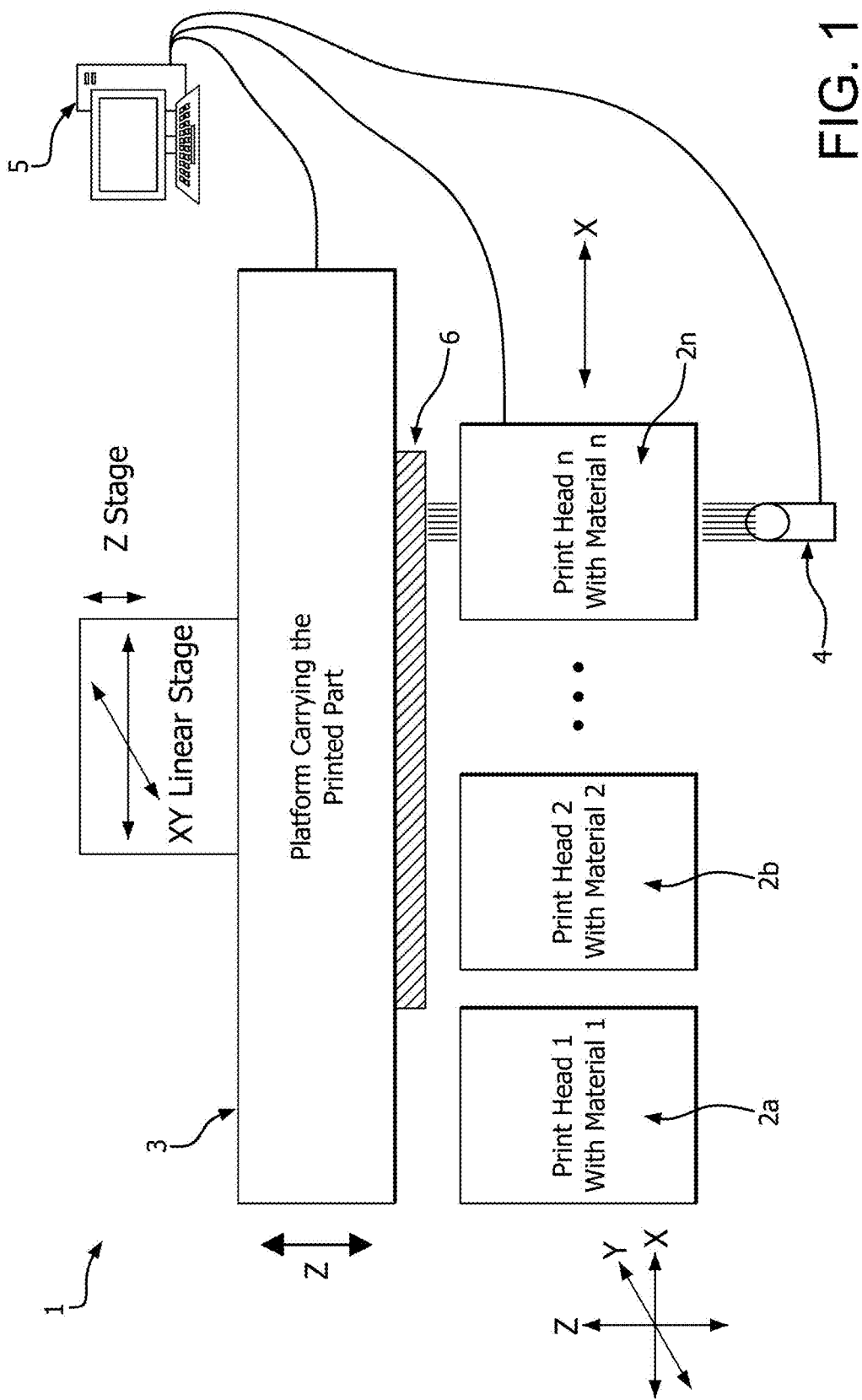
FIG. 1 illustrates a multi-material 3D printing apparatus in accordance with various embodiments of the present disclosure.
Figure 2A:
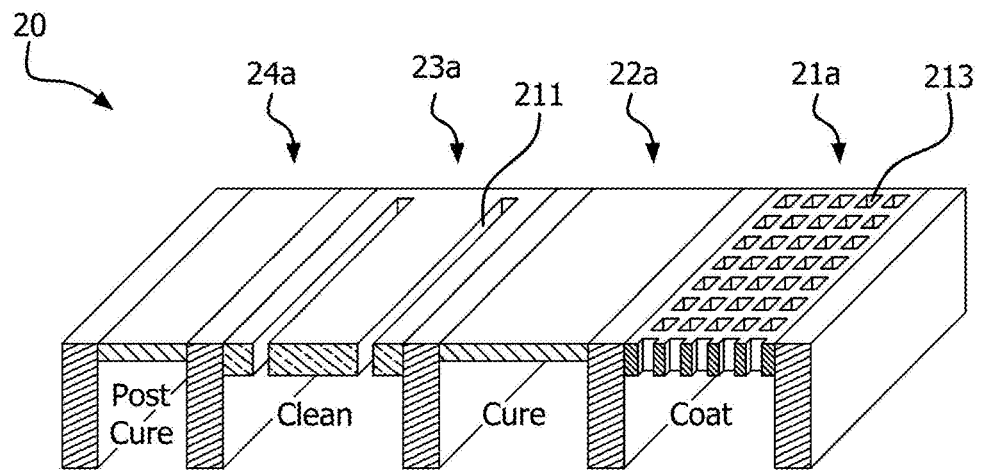
FIGS. 2A and 2B illustrate a printhead device in accordance with various embodiments of the present disclosure.
Figure 2B:
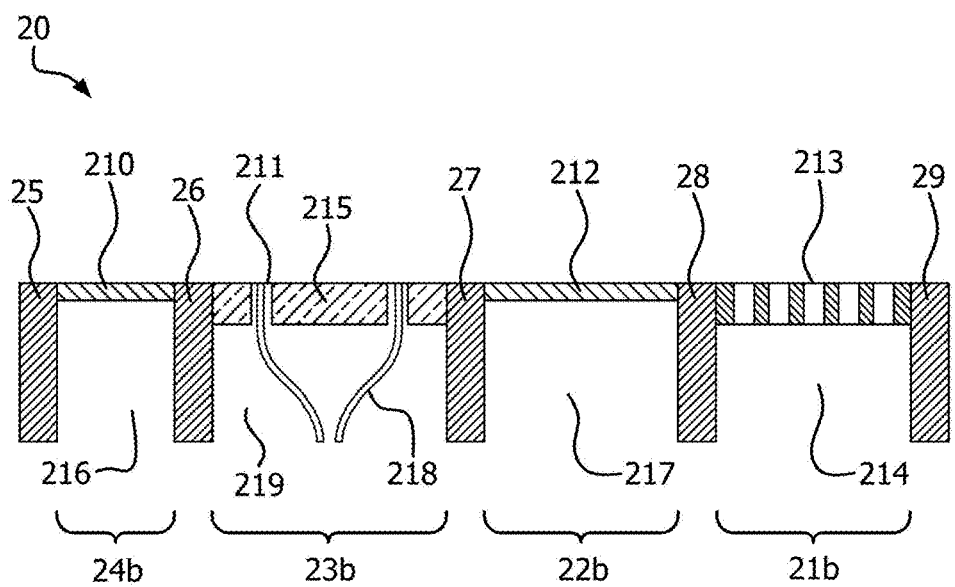
Figure 3:
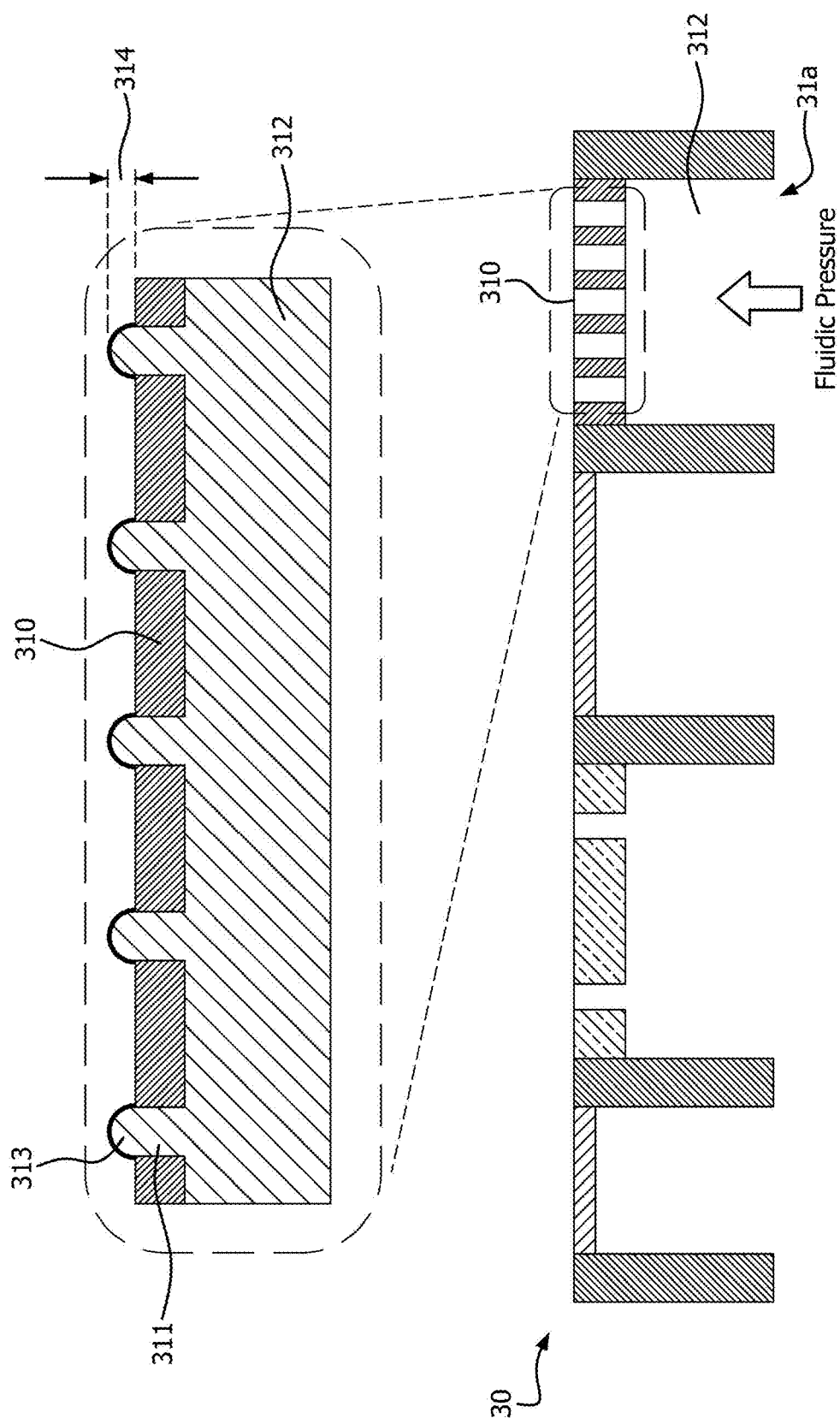
FIG. 3 illustrates various aspects of a coating section in a printhead device in accordance with the present disclosure.
Figure 4A:
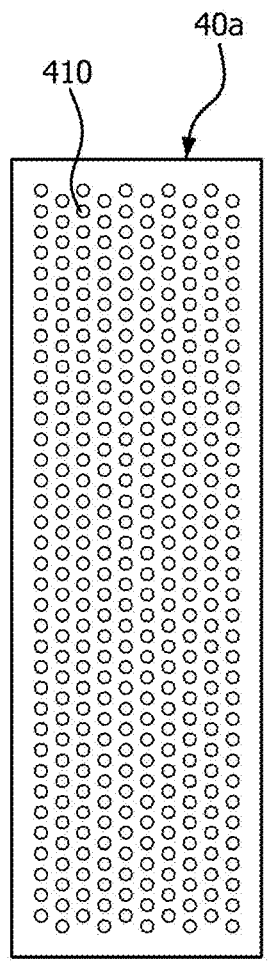
Figure 4B:
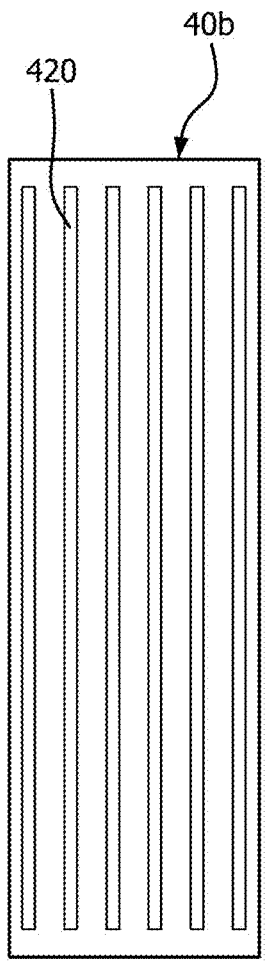
Figure 4C:
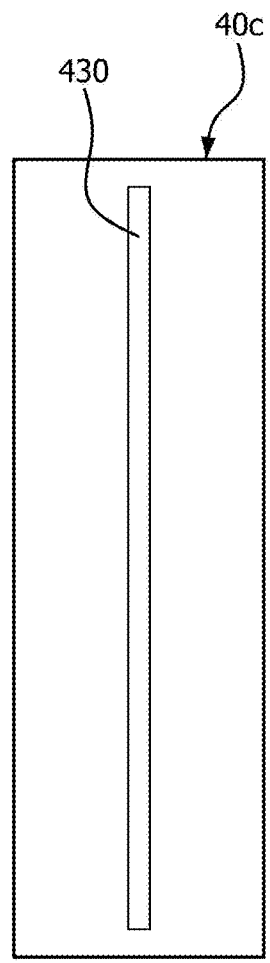
Figure 5:
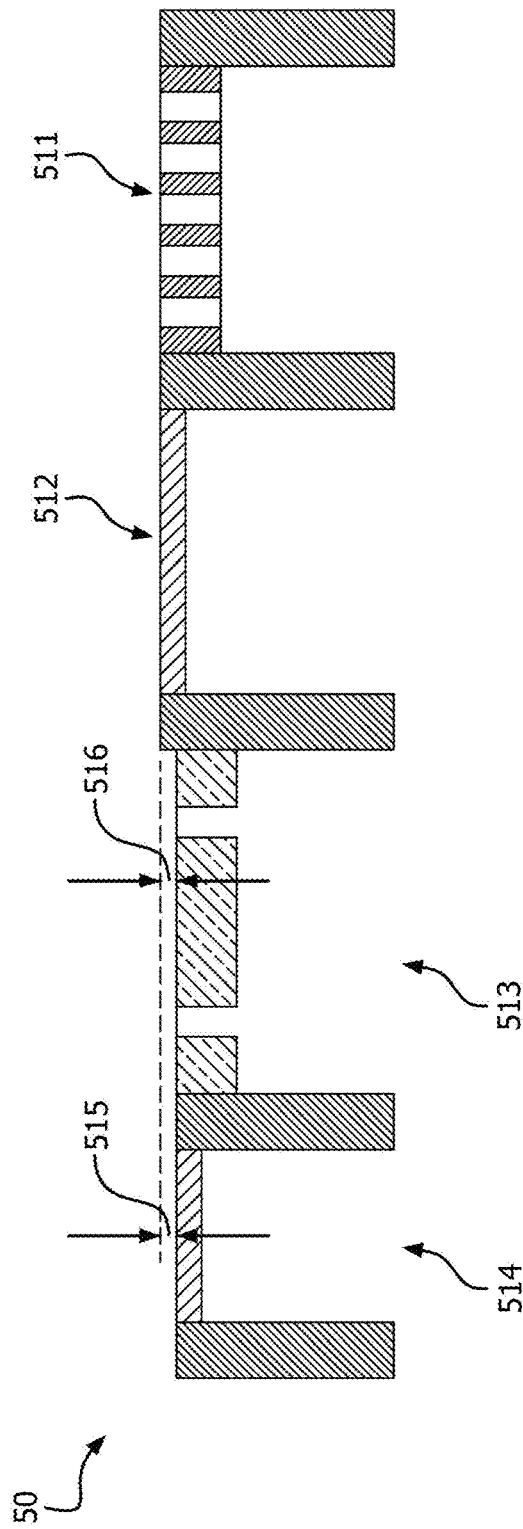
Figure 6:
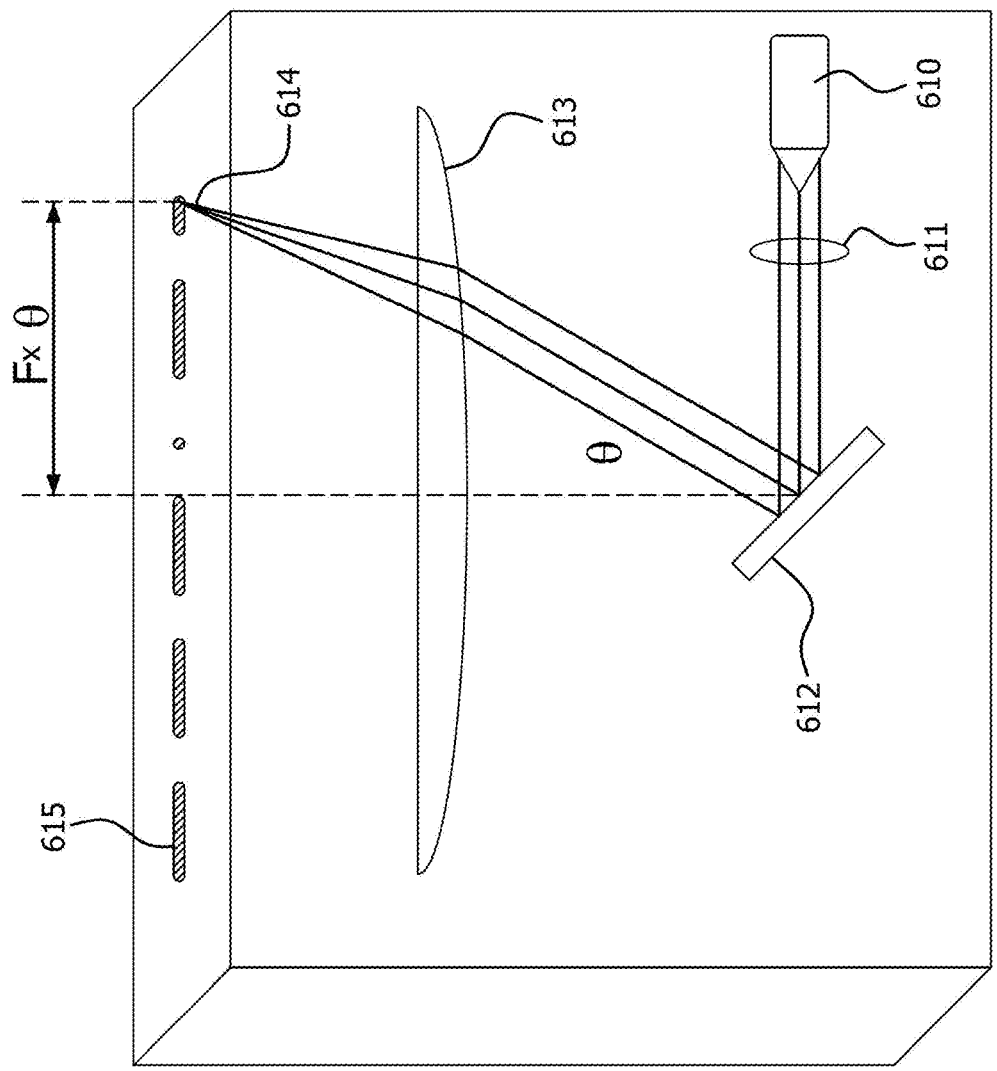
Figure 7:
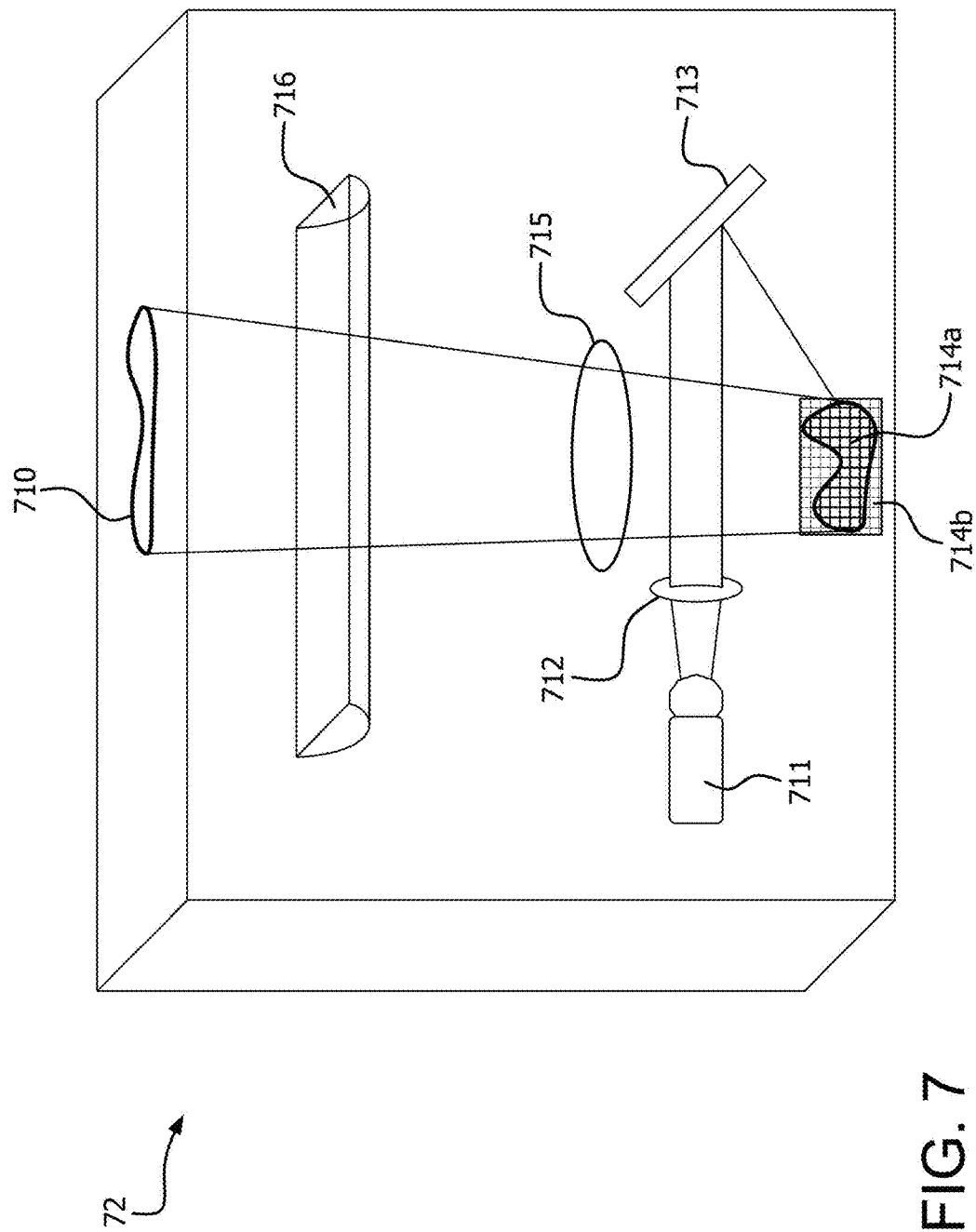
Figure 8:
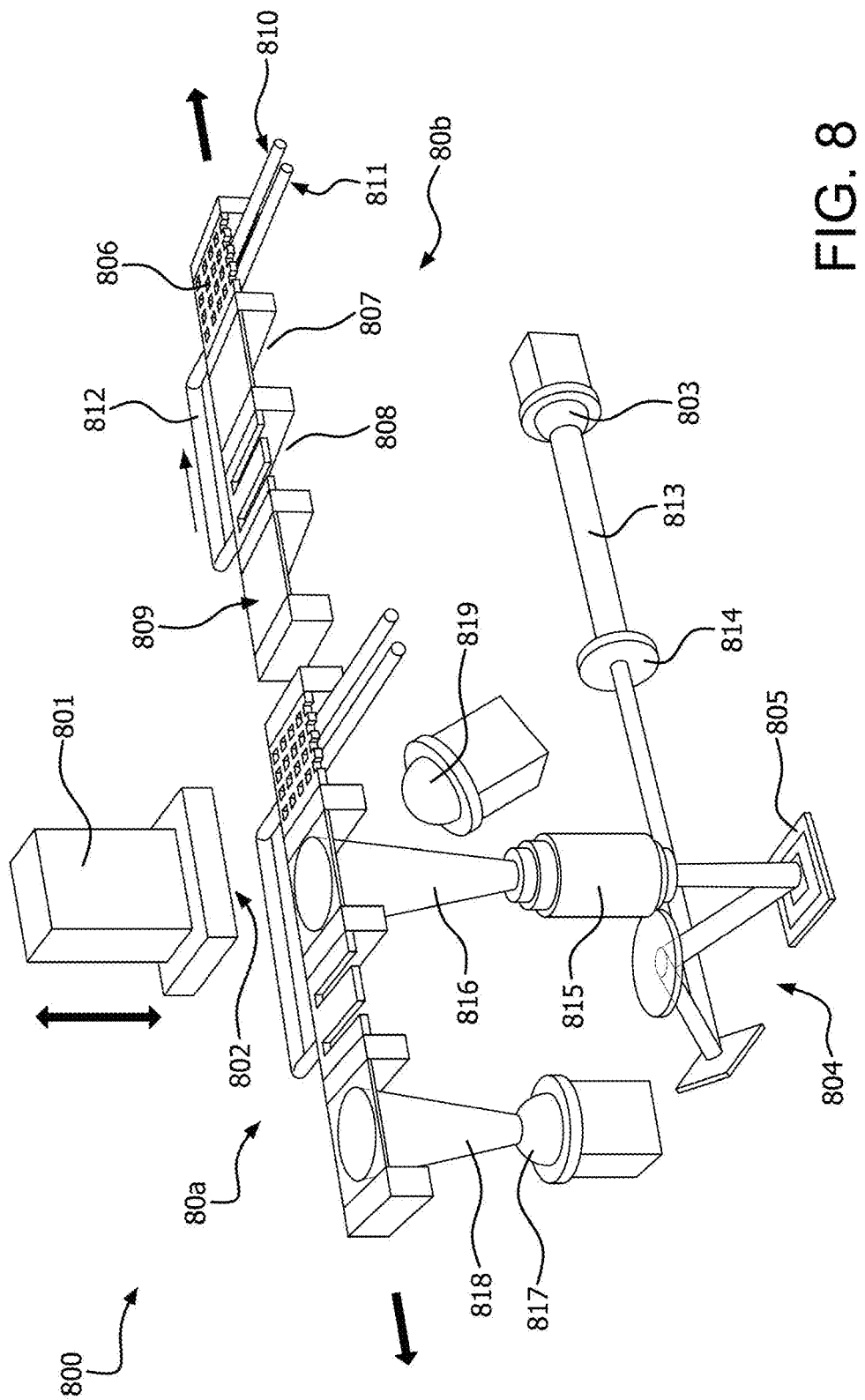
Figure 9A:
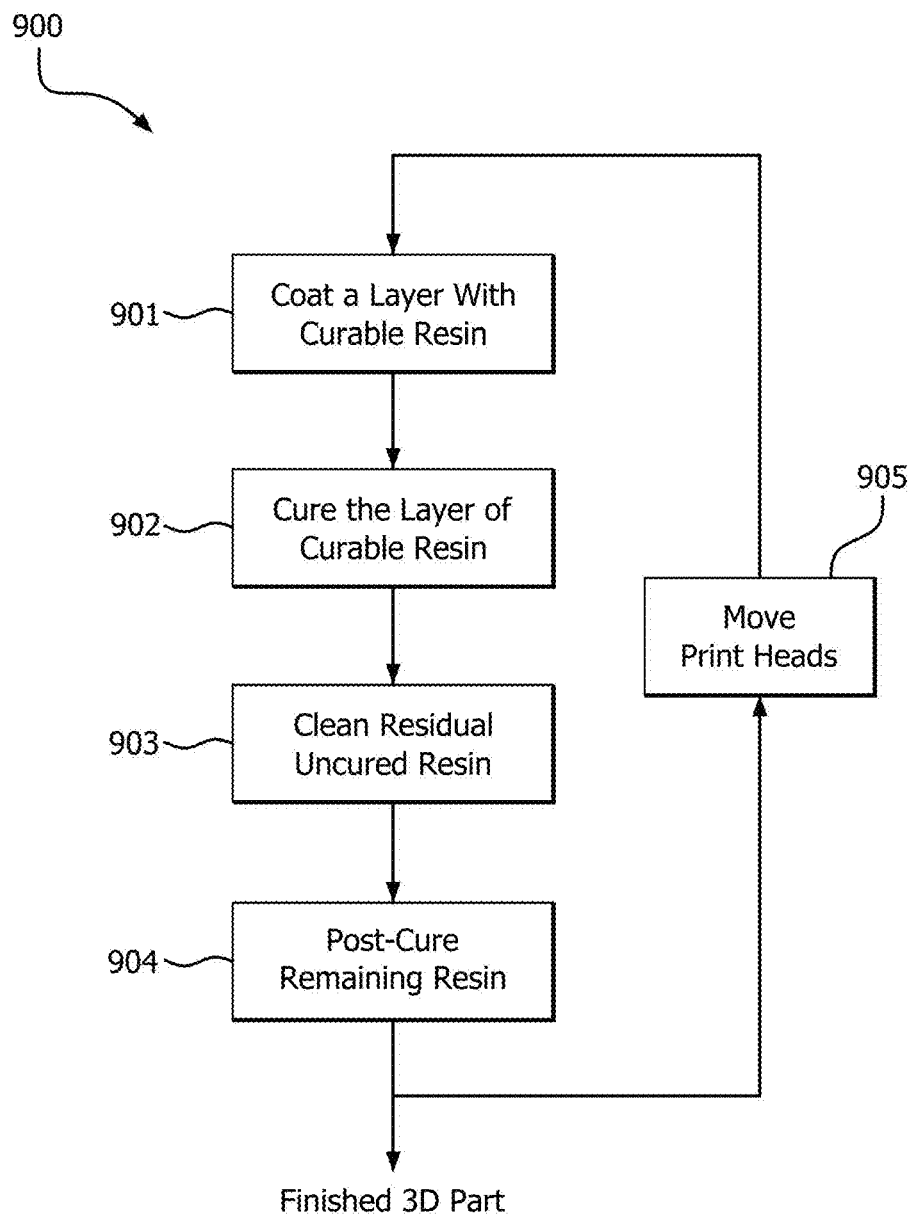
Figure 9B:
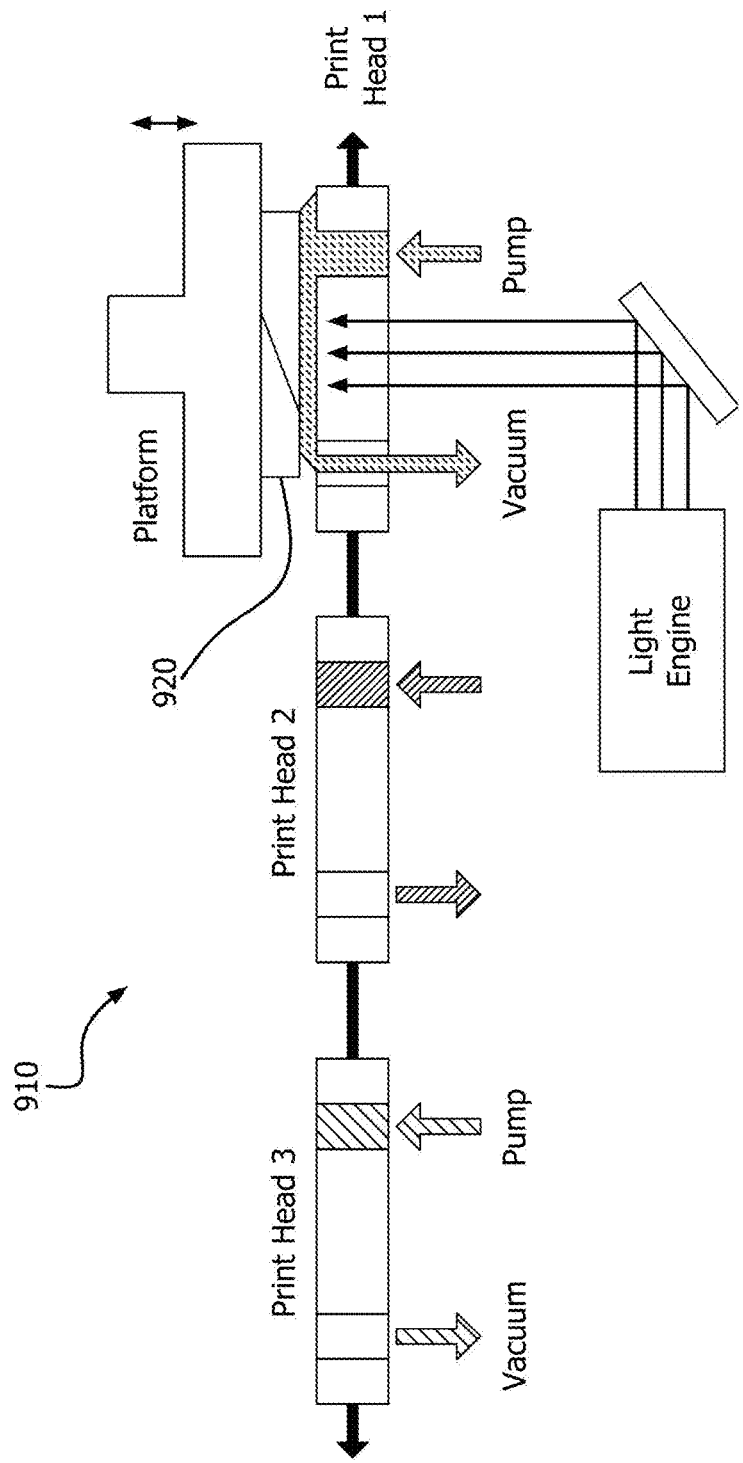
Figure 9C:
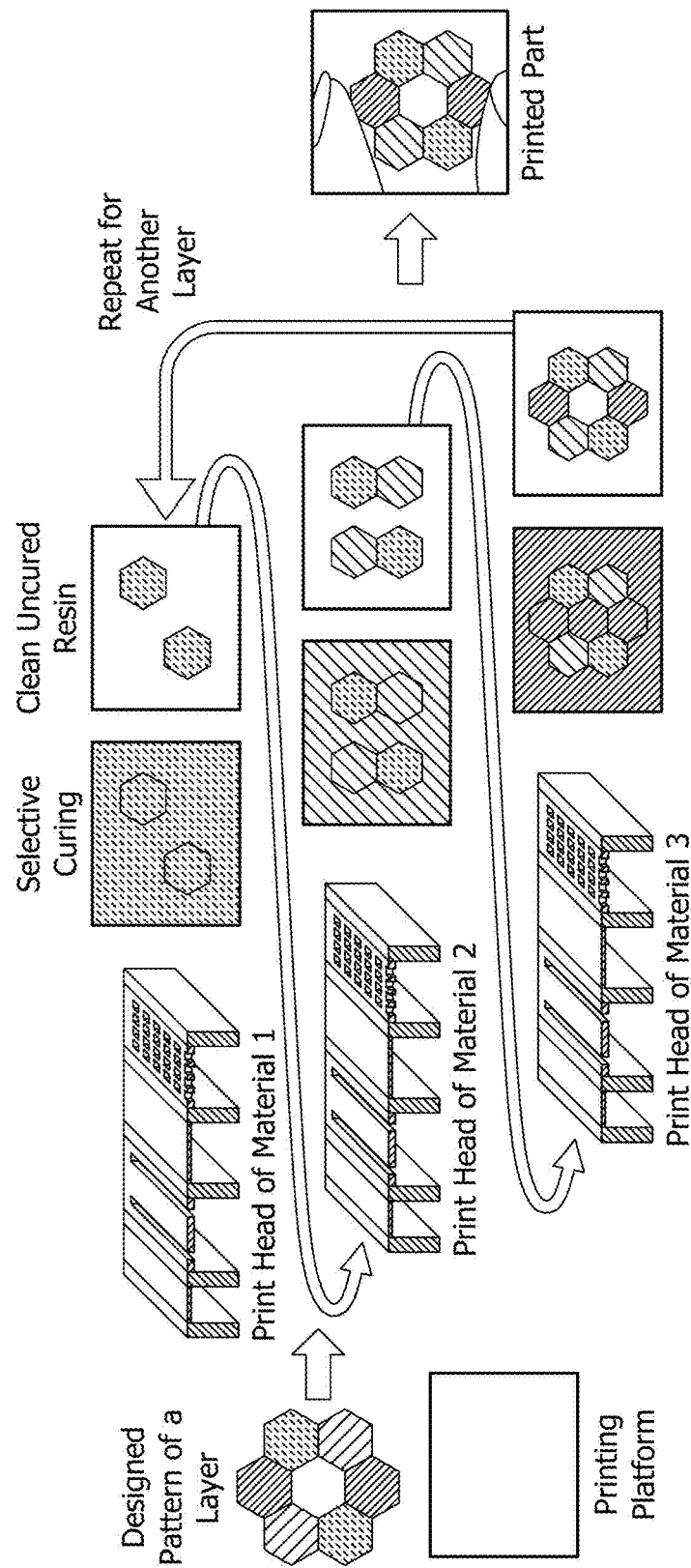
Figure 10:
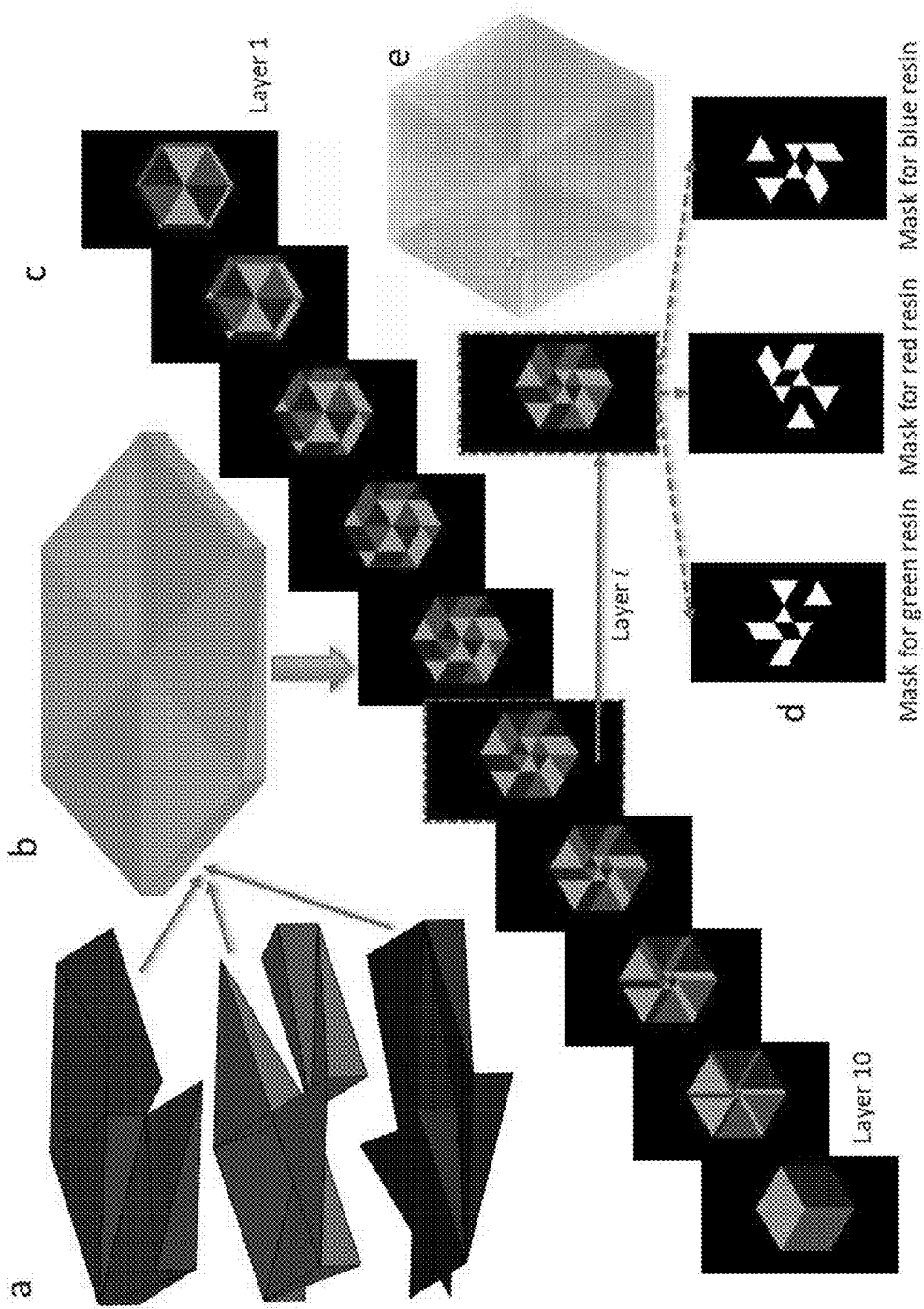
Figure 11:
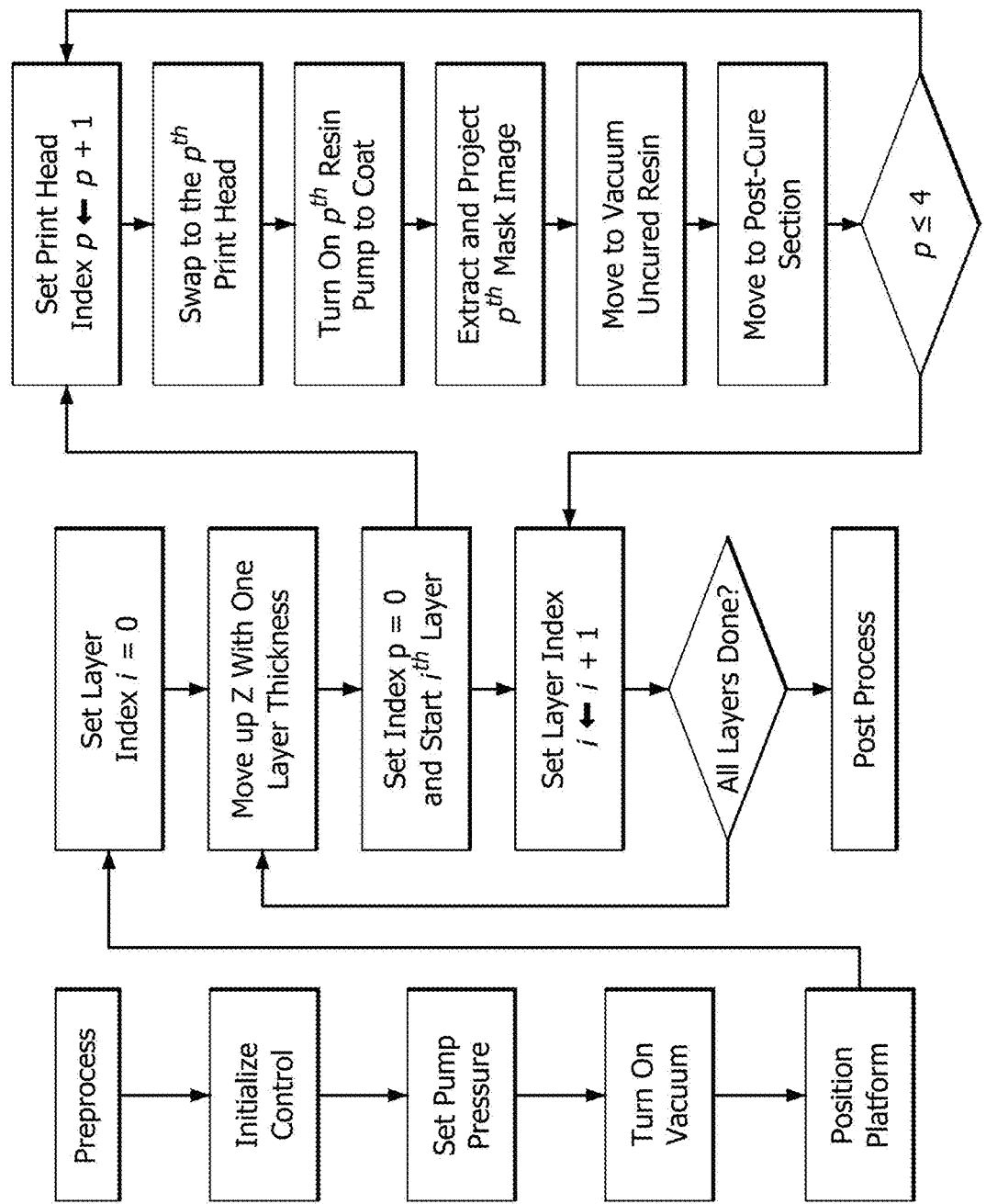
Figure 12:
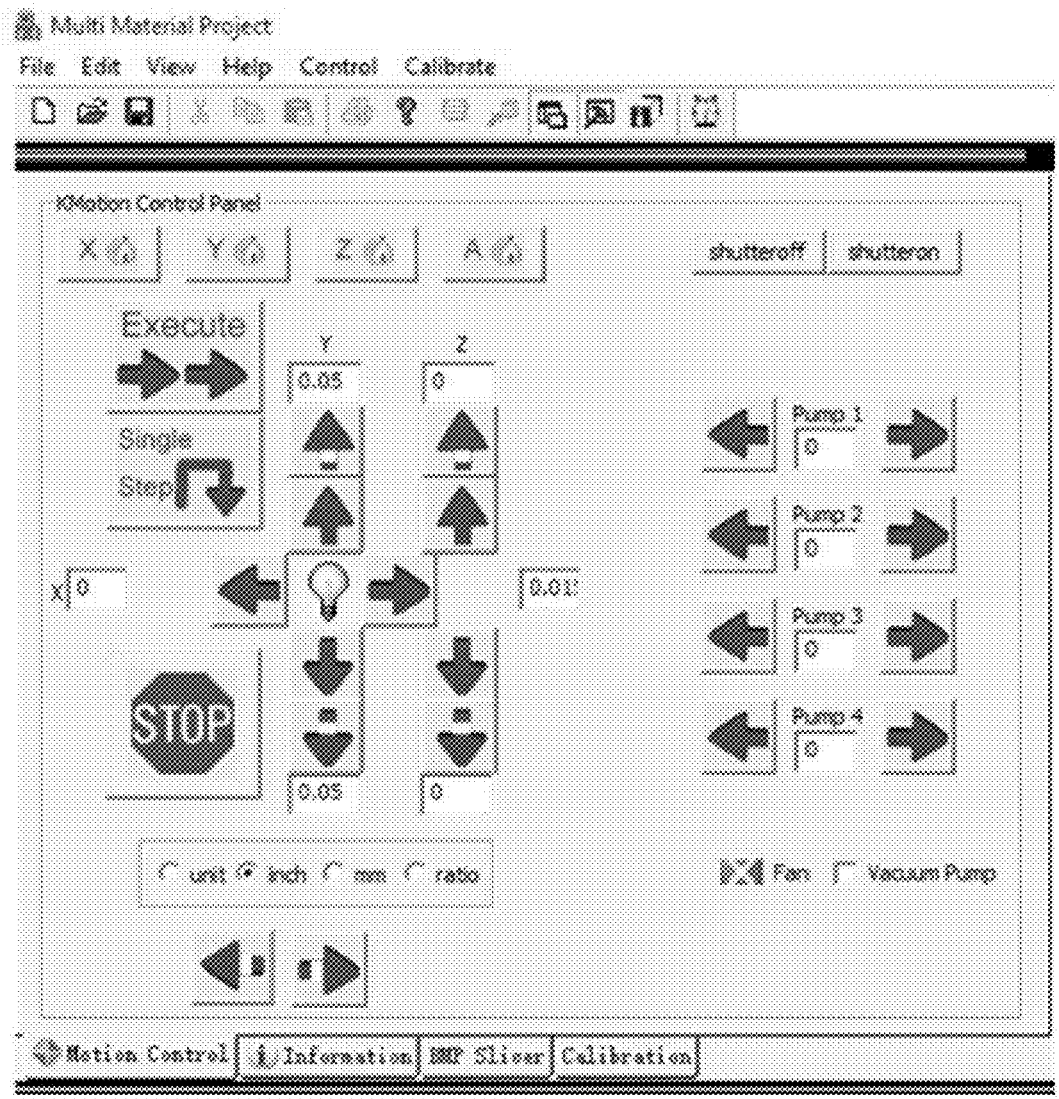
Figure 13:
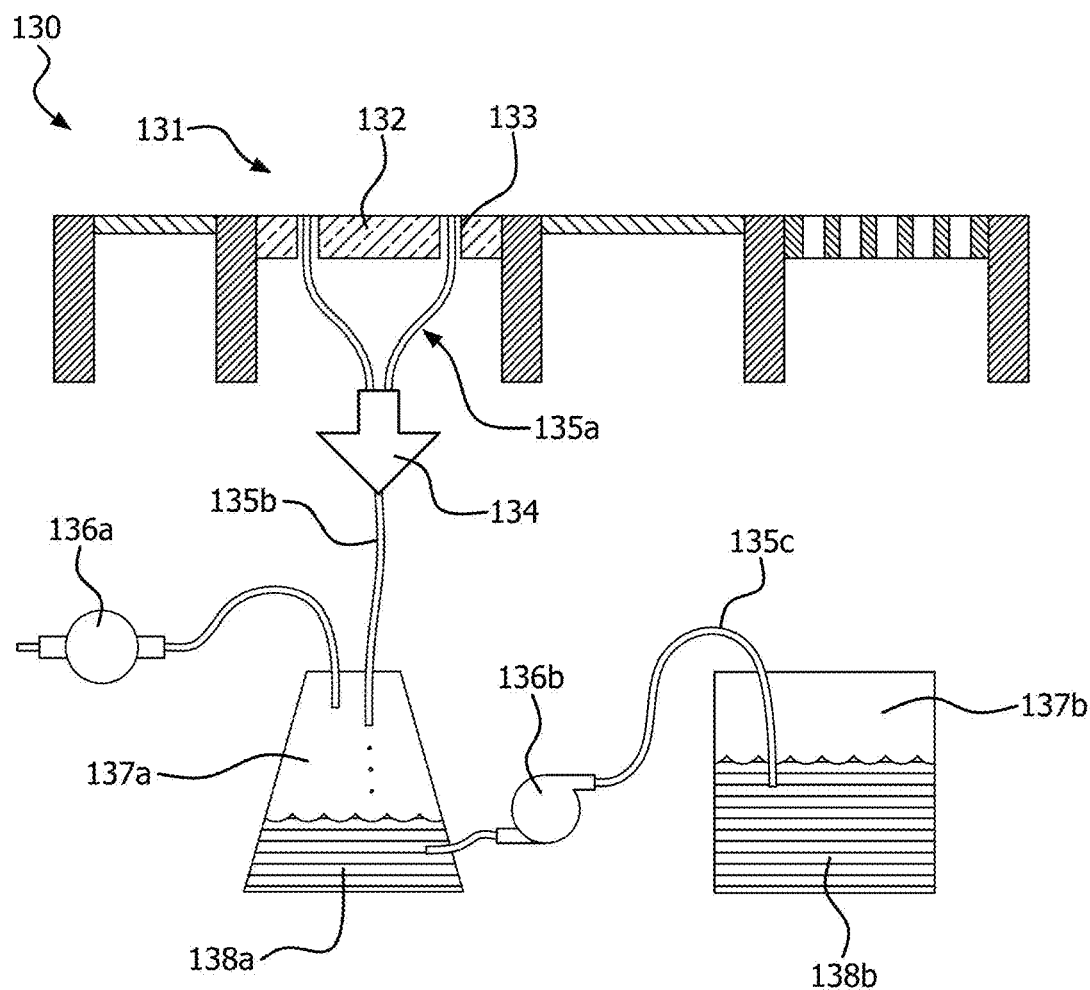
Figure 14A:
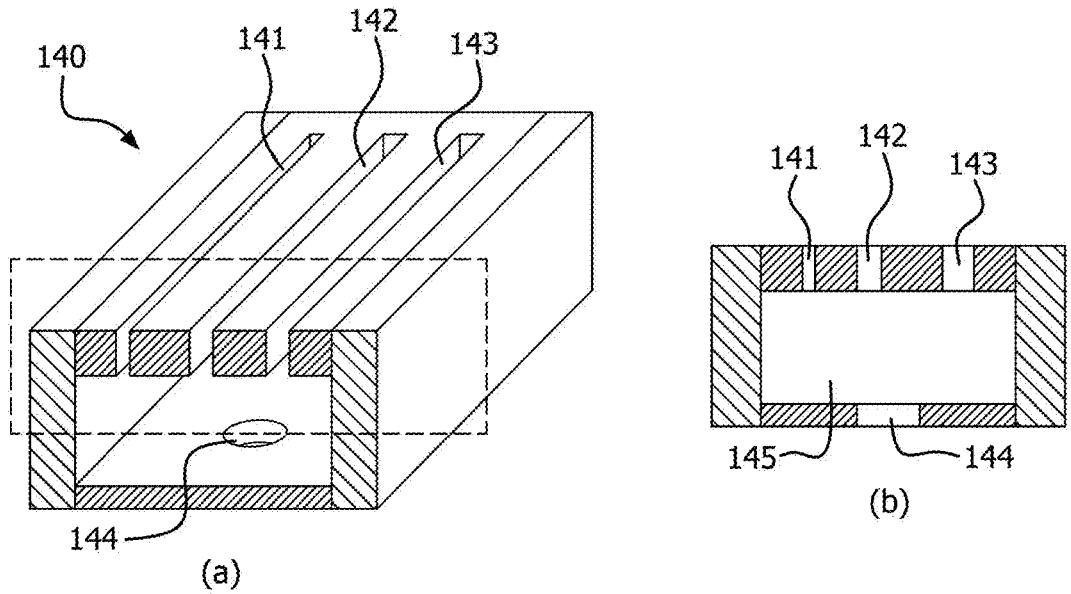
Figure 14B:
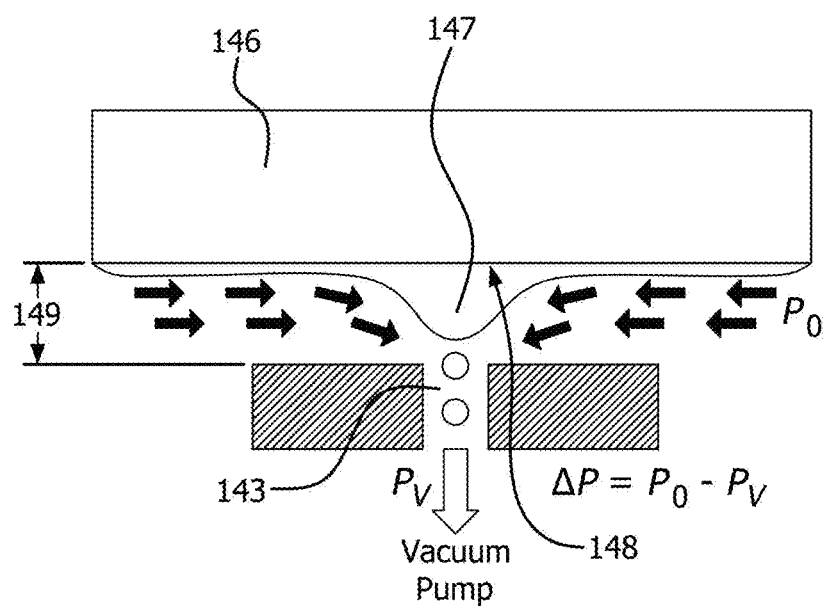
Figure 15:
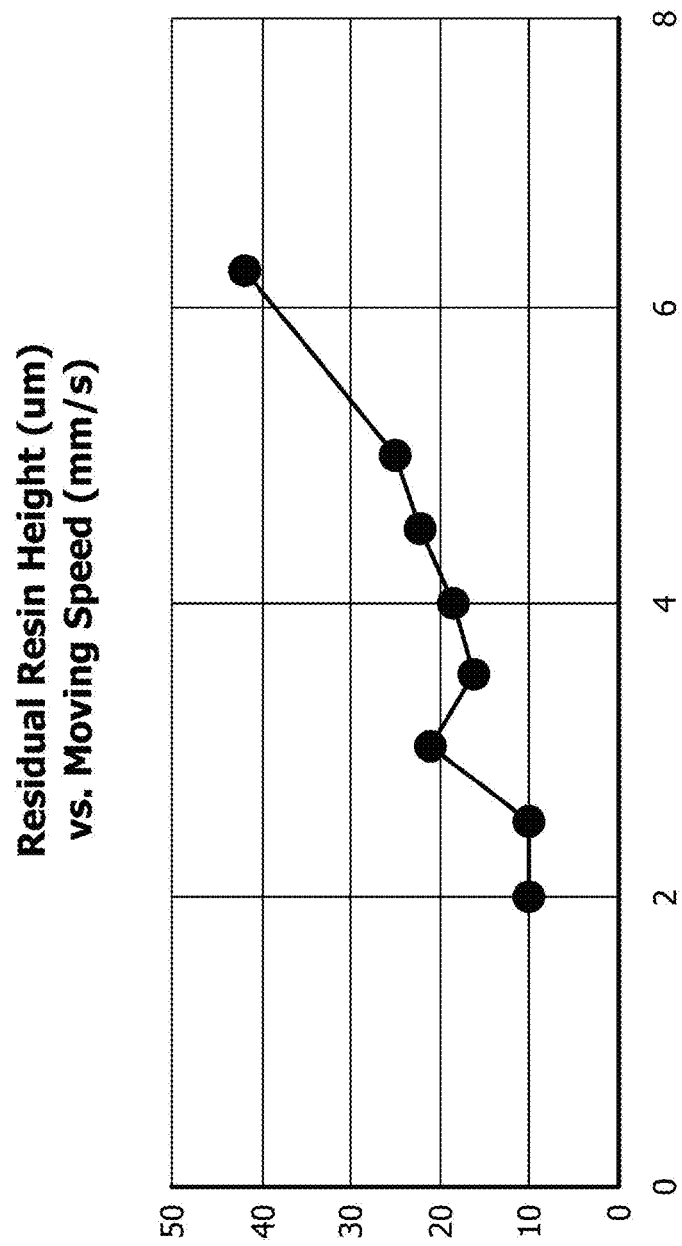
Figure 16:
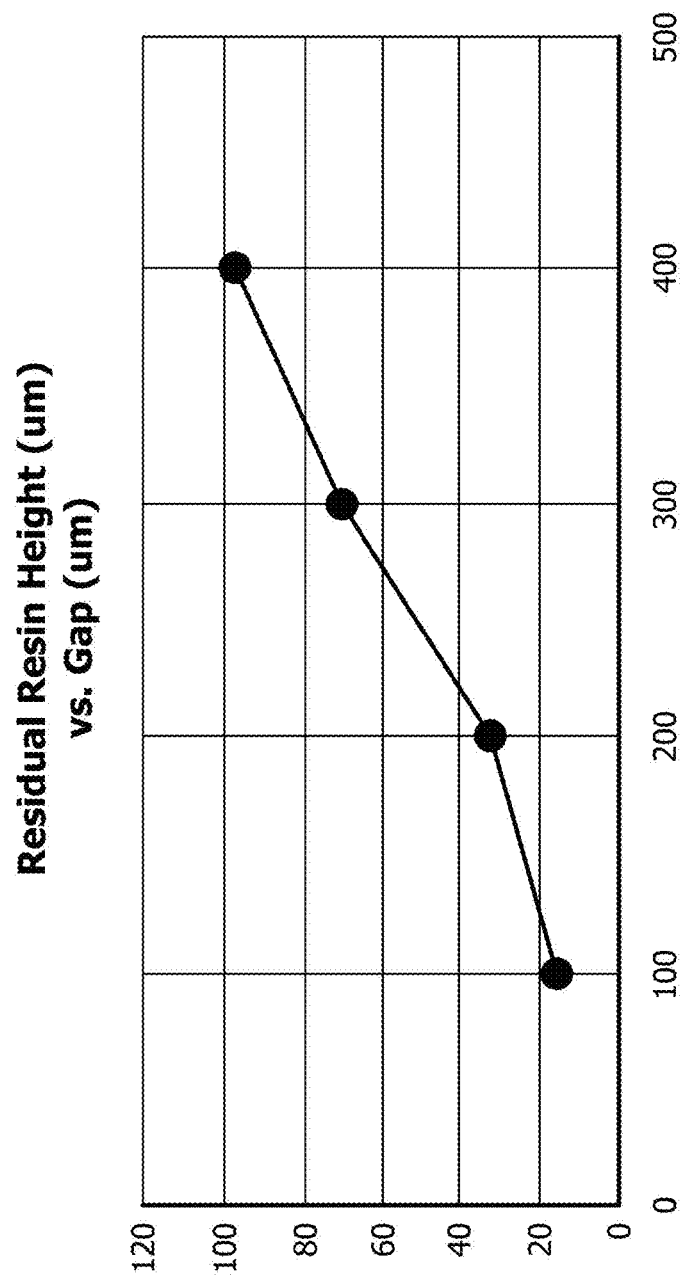
Figure 17:
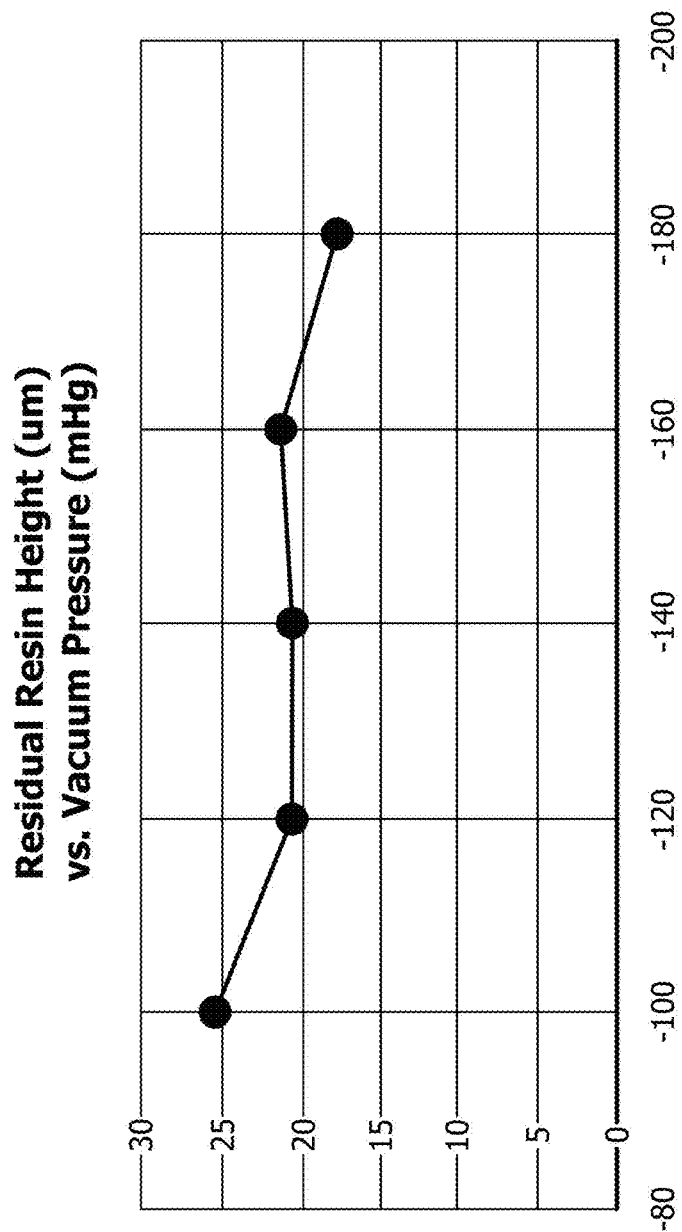
Figure 18:
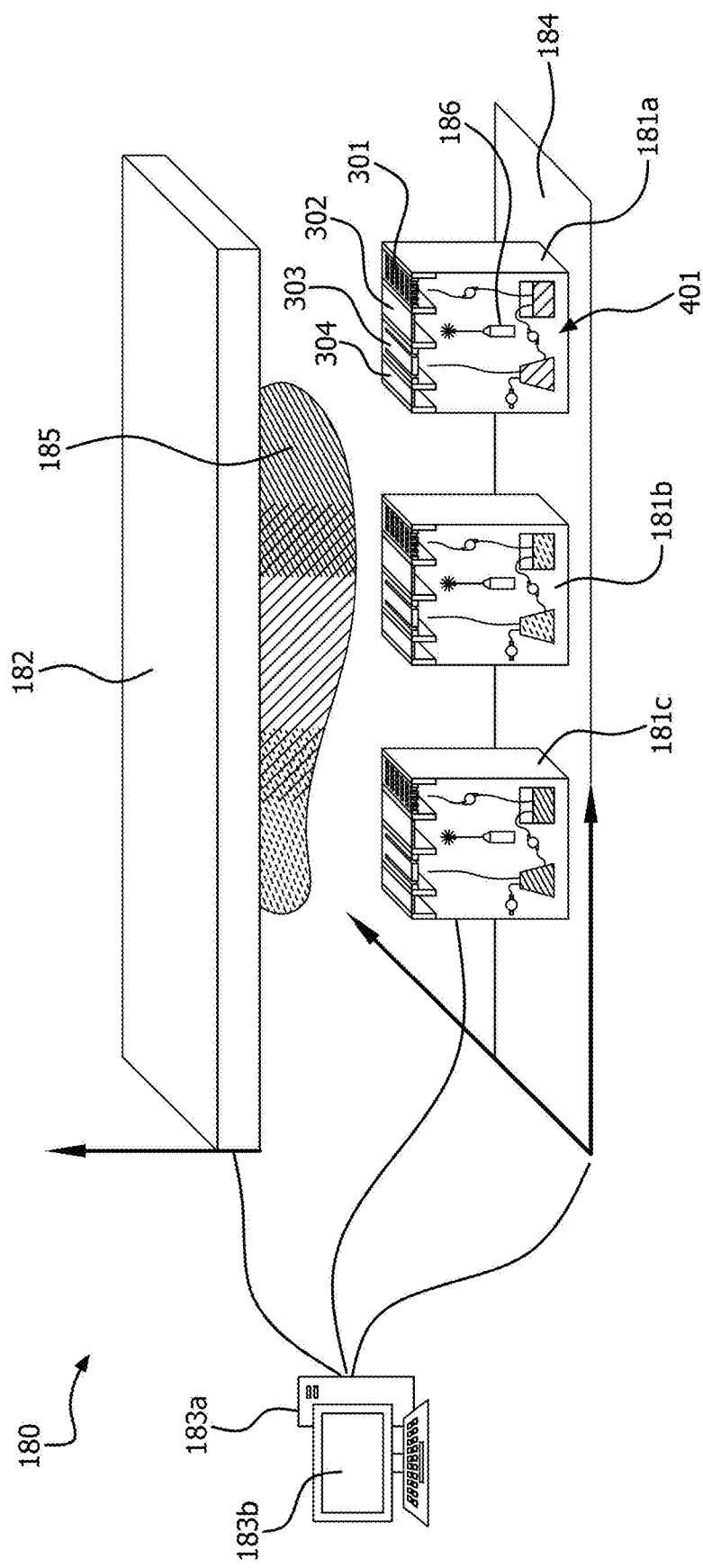
Figure 20C:
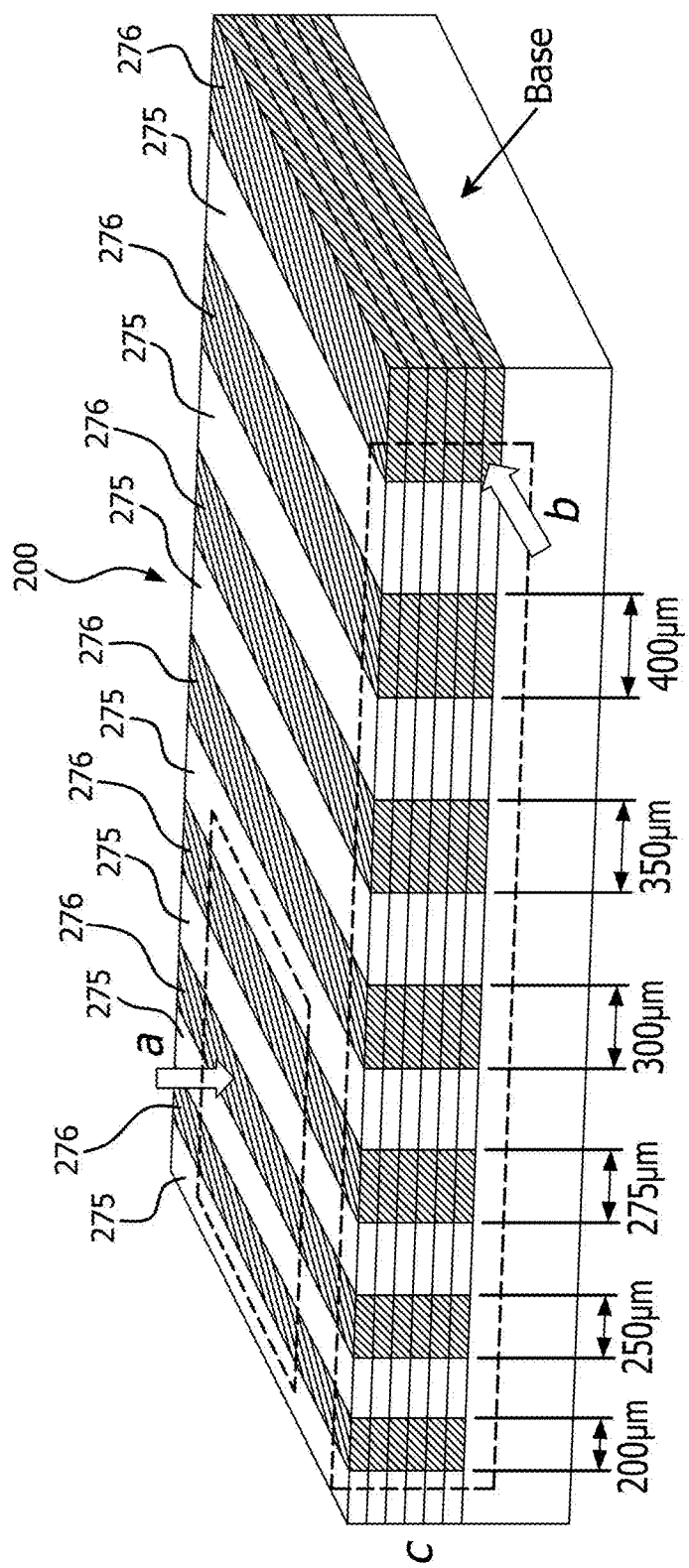
Figure 21:
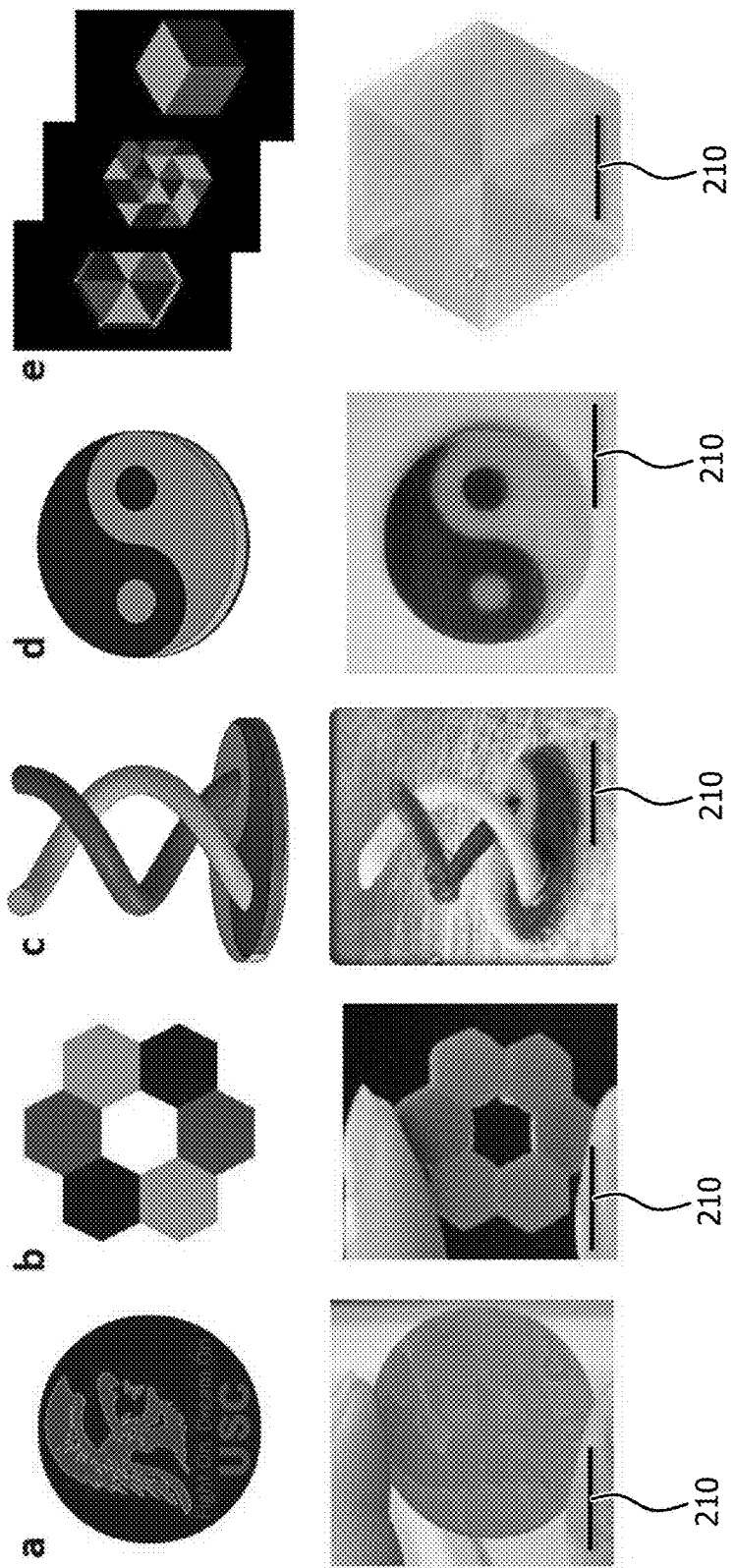
Figure 22:
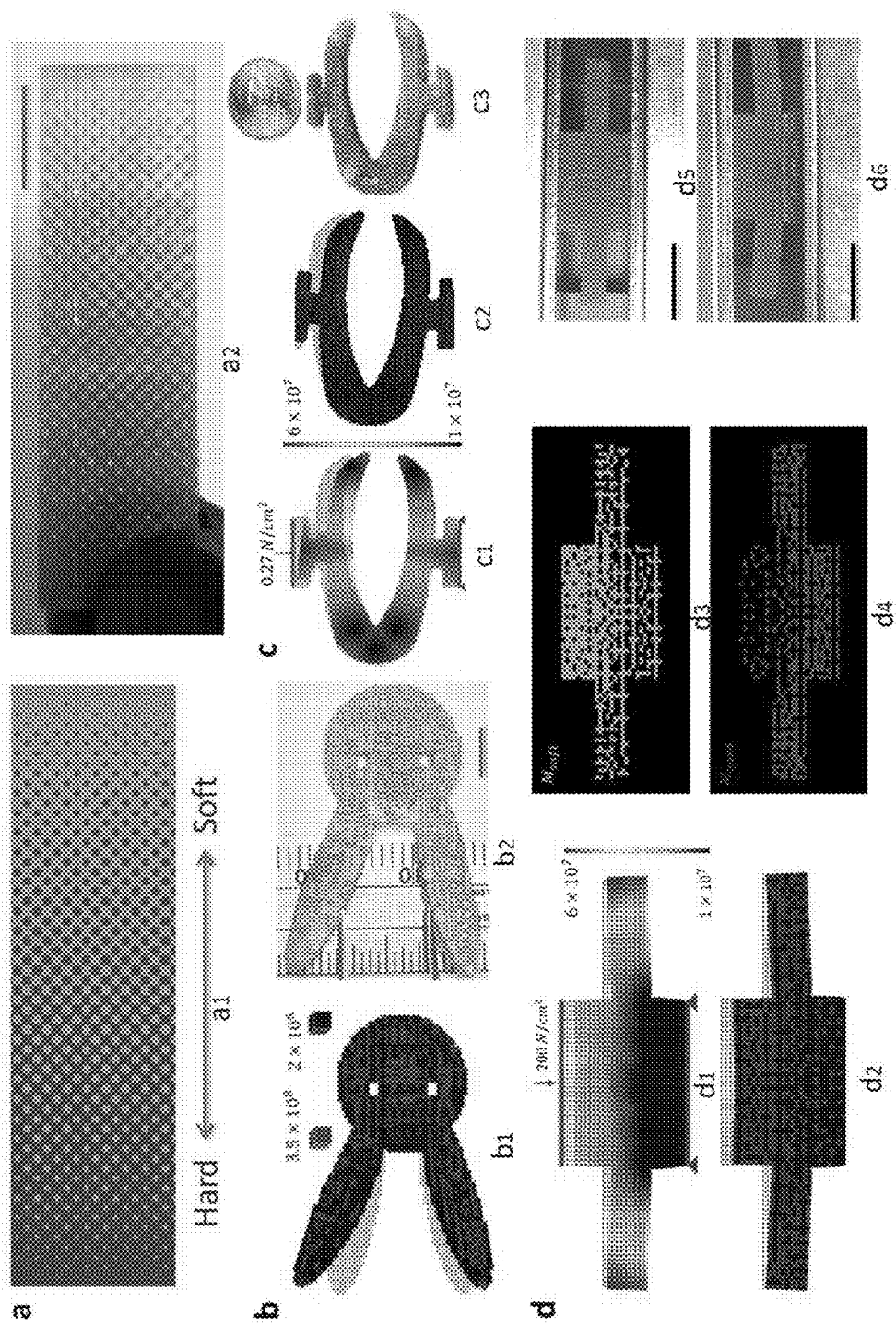
Figure 23C:
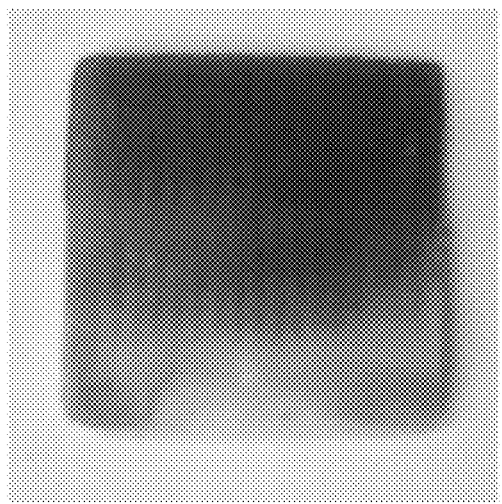
Figure 23B:
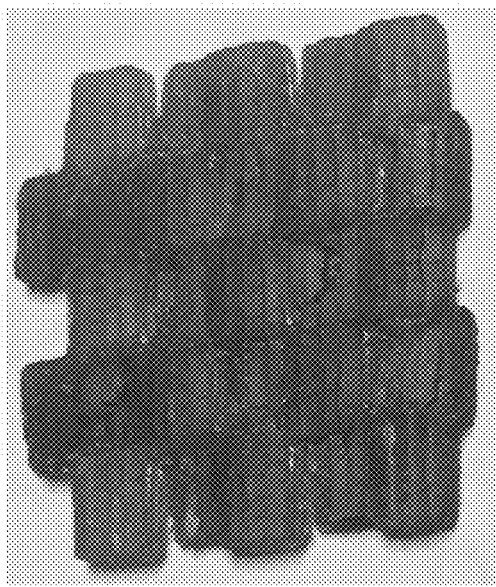
Figure 23A:

FIGS. 4A, 4B, and 4C illustrate three different functional designs for a top surface of a coating section of a printhead device according to the present disclosure, with the fenestrations providing dispensation of resin onto the part being printed;

FIG. 5 illustrates a cross-sectional view of a printhead device according to various embodiments of the present invention, showing optional height differences between the four sections of the printhead device;

FIG. 6 illustrates an optical system for curing resin in a 3D printing process according to the present disclosure;

FIG. 7 illustrates an optical system for curing resin in a 3D printing process according to the present disclosure, wherein the optics system comprises a digital micromirror device (DMD);

FIG. 8 illustrates a multi-material 3D printing apparatus in accordance with various embodiments of the present disclosure;

FIG. 9A illustrates a multi-material 3D printing process in accordance with the present disclosure, comprising the steps of coating, curing, cleaning and post-curing ("C3P");

FIG. 9B illustrates a multi-material 3D printing apparatus in accordance with various embodiments of the present disclosure;

FIG. 9C illustrates a multi-material 3D printing process in accordance with the present disclosure, comprising the use of three printhead devices, each coating and curing a different material;

FIG. 10 illustrates a strategy for slicing a 3D model to fabricate a multi-material object shown in (e). In this example, the given CAD design contains 3 STL models, wherein each STL model need to be fabricated with a unique material;

FIG. 11 illustrates a control flowchart of a 3D printing process comprising the steps of coating, curing, cleaning and post-curing, for an apparatus comprising multiple printhead devices;

FIG. 12 illustrates an example of user interfaced system control of a 3D printing process of the present disclosure, shown as a computer screen shot;

FIG. 13 illustrates various embodiments of a cleaning section configuration in a printhead device of the present invention, showing a system for recovering and collecting uncured resin vacuum off a part being fabricated;

FIGS. 14A and 14B illustrate a configuration for a cleaning section of a printhead device, and a study on the efficiency of the vacuuming process of removing uncured resin off the part being fabricated;

FIG. 15 illustrates an x/y-plot of residual resin height (calculated) versus the speed at which the cleaning section of the printhead moves relative to the part being vacuumed of uncured resin;

FIG. 16 illustrates an x/y-plot of residual resin height (calculated) versus the gap distance between the top of the cleaning section of the printhead and the part being fabricated;

FIG. 17 illustrates an x/y-plot of residual resin height (calculated) versus the magnitude of the vacuum (negative pressure) applied to a slot in the cleaning section of the printhead device;

FIG. 18 illustrates a multi-material 3D printing apparatus in accordance with various embodiments of the present disclosure;

FIG. 19B1 illustrates an embodiment of a functional design of a screen mesh top for a coating section of a printhead device in accordance with the present disclosure, comprising a 6×34 array of square holes;

FIG. 19B2 is a photograph of the fabricated screen mesh of FIG. 19B1;

FIG. 19B3 is a photograph of the fabricated screen mesh of FIG. 19B1 with liquid resin pushed out of the holes under pressure;

FIGS. 20A1/A2, and FIG. 20B1/B2 illustrate the fabrication of a two-material part having interlaced lines of varying sizes. FIG. 20A1 shows a photograph of a portion of the top of the fabricated part represented by (a) in the CAD model, with FIG. 20A2 providing a drawing of the photograph. FIG. 20B1 shows a photograph of a portion of the side of the fabricated part represented by (b) in the CAD model, with FIG. 20B2 providing a drawing of the photograph. The scale bars 299 in the two photographs FIG. 20A1 and FIG. 20B1 are 200 µm;

FIG. 20C illustrates the CAD model 200 used in the fabrication of the two-material part shown in FIGS. 20A1/A2, and FIG. 20B1/B2;

FIG. 21 illustrates examples of parts successfully fabricated using a prototype multi-material 3D printing apparatus according to the present disclosure. The top row illustrates the input designs, and the bottom row shows photographs of the corresponding fabrication results. The inputs of (a) and (b) are BMP images; the inputs of (c) and (d) are STL models designed using SolidWorks; and the input of (e) is a set of images that were computed from three STL models. All the scale bars in the photographs are 10 mm;

FIG. 22 shows the controlled mixing of two different materials to generate gradient stiffness, ranging from a rigid material to a soft material; (a) shows a digital pattern used to transit between two different materials along with the as-printed result; (b) shows a 3D-printed component with designed digital material compositions to achieve non-symmetrical deformations under the same loading force; (c) and (d) show the fabrication results of two multi-material designs with complex gradient stiffnesses. Scale bars in the photographs are 10 mm; and FIGS. 23A, 23B, and 23C show photographs of additional multi-material parts fabricated by the prototype multi-material 3D printing apparatus.

DETAILED DESCRIPTION

The detailed description of exemplary embodiments makes reference to the accompanying drawings, which show exemplary embodiments by way of illustration and their best mode. While these exemplary embodiments are described in sufficient detail to enable those skilled in the art to practice the invention, it should be understood that other embodiments may be realized and that logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments of the present disclosure, devices, apparatuses, processes and systems for curing-on-demand (COD) multi-material 3D printing are described.

Definitions and Interpretations

As used herein, the term "3D printing" refers to three-dimensional printing of tangible objects.

As used herein, the acronym "COD" refers to curing-on-demand 3D printing processes.

As used herein, the acronym "DOD" refers to deposition-on-demand 3D printing processes.

As used herein, the acronym "MJM" refers to multi-jetting modeling, a type of DOD 3D printing.

As used herein, the acronym "FDM" refers to fused deposition modeling, a type of DOD 3D printing, also known as "fused filament fabrication."

As used herein, the acronym "MSD" refers to multi-syringes deposition, a variation of FDM and a type of DOD 3D printing.

As used herein, the acronym "AM" refers to the umbrella category of additive manufacturing processes.

As used herein, the acronym "SL" refers to stereolithography processes. In SL, a light source is aimed upwards and through a transparent bottom of a tank filled with a layer of photocurable resin, wherein the part, growing by layers of resin cured by the light source, is incrementally pulled upwards by a lifting platform as each layer is cured.

As used herein, the term "multi-material 3D printing" takes on its ordinary meaning in the field of 3D printing, meaning a printing method that can produce a 3D object comprising multiple materials, rather than comprising only a single material. In some instances, the multiple materials in a 3D printed objects may comprise the same thermoplastic or photocurable resin, but with different colors. Multi-material 3D printing produces objects having complex and/or heterogeneous arrangements of materials from a single printer. In various embodiments, a particular material is chosen for each "voxel" within the finished part, with a voxel referring to a three-dimensional pixel inside the part. An example of a finished article resulting from multi-material 3D printing might be a child's toy (a car, boat, etc.) having different colors for the various features of the toy.

As used herein, the term "modeling" takes on its ordinary meaning as a preparatory stage to a 3D printing process, namely the creation of a computer rendering of an object to be 3D printed, the rendering typically created with a computer-aided-design (CAD) software, or by laser 3D scanning of a prior part to be duplicated or a space to be filled by a 3D printed part, or by other methods such as digital photography. Typically, the computer modeling results in an STL file (a stereolithography file), from which the desired physical part will be 3D printed. The STL file is digitally sliced by "slicer software" that converts the computer rendering into a series of thin layers that form the basis of how the part will be printed. A G-code file instructs a 3D printer to print the desired object by additively printing the thin layers.

As used herein, the term "mask-image-projection-based stereolithography" takes on its ordinary meaning in 3D printing, wherein a 3D computer-generated 3D image is first digitally sliced into horizontal planes and each slice converted into a 2D mask image. Each mask image is then projected onto the surface of a photocurable liquid resin and a light beam is projected onto the resin to cure the resin in the shape of the layer.

As used herein, the terms "material" and "resin" are used interchangeably to mean a curable polymer, metal, or ceramic substance, used by one of skill in the art of 3D printing in a 3D printer. These materials include, for example, polymer resins, thermoplastic powders, plastic filaments, hot-melt plastics, UV-curable acrylics, and so forth. Of interest herein are primarily the liquid photocurable polymer resins, curable by an appropriate light source. These photocurable materials can be thermoset, meaning that the material is capable of strengthening as it is heated, but the material cannot be remelted or reheated once photocured with an appropriate light source. These materials may include acrylates, polyimides, polyurethanes, and so forth.

Regarding the various drawing figures, printhead devices may be drawn without having any bottom surface, for the sake of simplifying the illustrations. It should be understood that a printhead device, and/or any one of the coating, curing, cleaning, and post-curing sections, can be configured as a box or any other cuboid structure, thus providing the option for one or more internal spaces or reservoirs. For example, a coating section of a printhead device may be configured in a cuboid shape with top, bottom and side walls defining an interior. In such an example, the interior can be filled with liquid resin and pressurized so that the liquid resin distributes out from openings configured in the top surface. It is understood that when a coating section of a printhead has openings in the top surface, those openings can provide a fluidic pathway from the reservoir to the outside of the top surface. In instances where there is no bottom surface, tubing can be connected directly to opening in the top surface, eliminating the need to have a closed structure.

GENERAL EMBODIMENTS

Multi-Material Printing Apparatus

In various embodiments, a multi-material 3D printing apparatus comprises:
at least one printhead device movable in an x/y-plane;
a build platform movable in a z-plane and configured to hold and move a part being printed by the apparatus;
a light source configured to cure at least one photocurable material used in the at least one printhead device; and
a non-transitory computer-readable medium encoded with program instructions for controlling the at least one printhead device, the build platform, and the light source to perform a process of multi-material 3D printing.

In certain aspects, a multi-material 3D printing apparatus comprises two or more printhead devices, so as to print with two different materials. In other aspects, a multi-material printing apparatus may comprise, two, three, four, five, six, or more printhead devices. For example, an apparatus comprising an assemblage of four printheads can support 3D printing of an object with four different materials. In variations of this example, three printheads may be used to print the object with red, blue, and green resin, for example, while a fourth printhead may be used to print a transparent supporting material. Accordingly, a fabrication process of one single layer is possible with the red, blue, and green resins.

In various embodiments, two or more printhead devices are linearly arranged in the multi-material printing apparatus along an x-axis so that linear movement of the linearly arranged printheads in the x-axis results in positioning each printhead in the linear series under the same location sequentially. In various embodiments, multiple printhead devices are fabricated together, such as having a common flat top surface. The printheads may be fabricated to a desired depth, in the y-direction, to accommodate certain printing that may involve large surface areas.

In various embodiments, printheads can be directly slid left and right on an x-axis to swap between materials without time-consuming up or down transitions on a z-axis. The sliding of the printheads also reduces the separation force using the shear force to separate the cured resin from the projection surface, which is smaller than the direct pulling-up force. In various aspects, printheads are only moved horizontally.

In various embodiments, a linear stage is configured to move multiple printhead devices as an assemblage along an x-direction or in any x/y direction. In various aspects, the stage is computer controlled by the program instructions encoded on the non-transitory computer-readable medium.

In various aspects, linear movement of a series of printhead devices arranged along the x-axis is computer controlled by the program instructions encoded on the non-transitory computer-readable medium.

In various embodiments, a multi-material printing apparatus comprises a build platform configured to move up and down in a z-direction, perpendicular to the x/y plane of the printhead device movement. In various embodiments, the build platform is coupled to a multi-axis motion control stage such that the program instructions encoded on the non-transitory computer-readable medium instruct movement of both the build platform and a series of printhead devices.

In various embodiments, the multi-material printing apparatus is configured to move the printheads together horizontally. The relative position of the projection system and the 3D-printed part are not moved during the sliding process. Hence the photocuring accuracy of different materials in a printed layer will not be affected by the switching of resins. Such a linearly moving printhead design enables the coating of a 3D-printed part with liquid resin as shallow as a single layer thickness.

With reference to FIG. 1, a general embodiment of an apparatus for multi-material printing, in accordance with the present disclosure, is illustrated.

In various embodiments, the multi-material 3D printing apparatus 1 comprises at least one printhead device 2 (each indicated as 2a, 2b, ... 2n); a build platform 3 on which a part 6 is fabricated, the build platform 3 configured to be moveable and to carry the part 6 being printed by the apparatus 1; a light source 4 configured to cure a photocurable resin used in the printing of the part 6; and a computing unit 5 comprising a non-transitory computer-readable medium encoded with program instructions for controlling the at least one printhead device, the build platform, and the light source to perform a process of multi-material 3D printing.

In various embodiments, each printhead device 2a, 2b, . . . 2n contains and distributes a unique material to the 3D printing process, such as a curable liquid resin composition, or different colored versions of the same curable resin. In various aspects, each printhead device 2a, 2b, 2n in the apparatus carries a unique curable material a, b, . . . n, respectively.

In various embodiments, each printhead device 2a, 2b, . . . 2n comprises a coating section, a curing section, a cleaning section, and, optionally, a post-curing section, each of which is described in more detail herein below. The coating section is configured to apply liquid uncured resin additively in layers to form a part. The curing section is configured to cure the uncured resin layer thus applied. The cleaning section is configured to remove uncured resin from the printed layers of the part and/or from the printhead after curing, such as directing a vacuum to positions of close proximity to the printed part. Finally, the post-curing section, when present, is designed to cure any remaining uncured material on the printed layers of the part not previously cured or vacuumed off, such as with a strong UV light source.

In various embodiments, each printhead device 2a, 2b, . . . 2n is configured to move laterally in the x/y plane, and in particular, to move horizontally along an x-axis. The build platform 3 is configured to move the part 6 being printed up and down in the z-plane, such as to control the thicknesses of the applied layers.

In various embodiments, the movement and operation of the printhead devices 2a, 2b, . . . 2n, the movement of the build platform 3, and the operation of the light source 4 for curing applied layers of resin are each computer controlled. Computer control is provided by a computing unit 5 comprising a non-transitory computer-readable medium encoded with program instructions for controlling the printhead devices, the build platform, and the light source to perform a process of multi-material 3D printing. The electrical connections, shown for example as hard wiring in FIG. 1, should not be interpreted literally to mean that just the build platform, only one printhead device, and the light source are hard wired to the computing unit 5. In various embodiments, the computing unit 5 may be in communication with a moveable stage attached to an assemblage of all of the printhead devices, to move them together as a set. Further, the computing unit 5 may communicate with and control other elements of the multi-material 3D printing apparatus, such as fluidic pumps, vacuum pumps, lens and mirror translations, and so forth. Lastly, any hard wired connections shown in the drawings herein or implied in the drawings or recitations are understood to optionally be configured as wireless.

The multi-material printing apparatus 1, comprising at least one printhead device, a build platform configured to move and carry a part being printed, a light source, and a computing unit comprising a non-transitory computer-readable medium encoded with program instructions, is configured to fabricate multi-material 3D object 6 layer by layer in accordance with a 3D printing process. Each layer of the multi-material 3D object 6 may consist of multiple types of photocurable materials applied by the coating section of each printhead device. Each printhead device 2a, 2b, . . . 2n may contain one unique material, and each printhead device is used to fabricate the corresponding portion of that material in a layer. Each printhead 2a, 2b, . . . 2n is configured to move along the x/y plane so that the coating section of the printhead can cover the area of an entire layer of the part being printed even if that area of material to be applied is larger than the size of the coating section of the printhead. The apparatus 1 provides for movement of the at least one printhead device 2 so that each one of the four sections of any one printhead 2a, 2b, . . . 2n may be positioned adjacent to where a layer of the part 6 is being printed. A set of printhead devices may be ganged together (even fabricated together with common elements) on a movable stage such that the set of printheads move in unison.

As explained in greater detail below, there may be only a single light source 4 in the apparatus 1 even though there may be two or more printhead devices 2a, 2b, . . . 2n. In certain embodiments, a curing section of a printhead device 2 many comprise only a transparent lens or open passageway configured through the entire thickness of the printhead such that the light emanating from the light source 4 is able to pass through the passageway in the printhead and project onto the layer of resin newly applied and to be cured. In this configuration, each passageway of each printhead device can be staged in the appropriate position for the single light source 4 to pass through and cure the layer of resin applied by that printhead device. Reflective lens can also be employed between the light source and the printhead and moved/translated appropriately to ensure the light path aligns with the passageway of the printhead being staged under the layer being photocured. In other embodiments, each printhead device may carry its own light source 4 or at least an end of a light transmitting conduit such as a fiber optic cable connected to the light source that directs light from a single light source evenly to each of the n-multiple printhead devices.

Printhead Devices

In various embodiments, each printhead device according to the present disclosure comprises a coating section, a curing section, a cleaning section, and, optionally, a post-curing section. In various aspects, need for the post-curing section can be decided on the basis of the type of curable resins being used in a 3D print job, the design of the part to be printed, and so forth. The post-curing section provides a sort of safeguard if it is expected that residual uncured resin could still remain on the printed layers of a part even after curing and cleaning steps.

Each printhead device present in a multi-material printing apparatus herein is designed to be a complete module, configured to coat, cure, clean and optionally post-cure a photocurable material individually and independently from other printheads arranged in the apparatus.

FIG. 2 illustrates a general embodiment of a printhead device 20 in accordance with the present invention. Printhead 20 is shown in perspective view in part (a) of the figure, and in cross-sectional view in part (b) of the figure. It is important to note that the left-to-right ordering of the various sections of the printhead device as illustrated is not meant to be limiting. Stated another way, the four sections can be in the opposite order, and the printhead would then be moved in the opposite direction along an x-axis to position each section. Although it is preferred to have coating, curing, cleaning and post-curing sections positioned in sequential order in a printhead, at least in theory these sections could be in any order. A different order than the order illustrated would require a left and right shifting of the printhead position rather than a stepwise incremental shift to position each section under the layer to be applied to the part being printed.

With reference to the perspective view (a), a printhead device 20 herein comprises three, and optionally four, sections. Namely, a coating section 21a, a curing section 22a, a cleaning section 23a, and optionally, a post-curing section 24a. These sections are shown in cross-section as 21b, 22b, 23b, and 24b, respectively, in part (b) of FIG. 2, as portions of a contiguously structured device. As mentioned, the three, or optionally four, sections could be arranged in the opposite sequence when viewed from left-to-right, or in any order.

In general, each of the sections are defined and spaced apart from one another with structural spacers 26, 27, and 28, and the printhead device closed in by the structural sides 25 and 29. Each section can be configured as a housing having walls as boundaries defining an interior space, with the interior space of a particular section being usable for some purpose or just left empty. In various embodiments, 25, 26, 27, and 29 are structural elements, providing support and separation between sections of the printhead device 20, whereas spacer 28 may be configured with a channel disposed therethrough. One or more channels optionally configured through spacer 28 provide a flow pathway for extra resin to return to the coating section reservoir or to a location removed from the printhead.

Coating Section

Beginning with the coating section 21 of the printhead 20 in FIG. 2, this section can be configured as a box or rectilinear housing structure having four sides (two of which are visible as spacers 28 and 29), a top 213, a bottom and an interior space. An exemplary design of the coating section incorporates the minimal amount of curable material sufficient to recoat an entire layer of the part being printed with a given layer thickness such as, for example, 50 μm or 100 μm. The coating section may further comprise an inlet connectable to a fluidic pump for the transfer of curable material into the coating section. In various aspects, the material to be coated may also reside in a material reservoir external to the coating section of the printhead. In some instances, the coating section may be envisioned to be the coating "head" whereas an external reservoir is the "bottle" or the supply of liquid resin. In other examples, liquid resin is first injected into the coating section of a printhead device and then air pressure is applied for the actual distribution of material. Various liquid pumps, mixing valves, external reservoirs, etc., are contemplated.

In various embodiments, the top 213 of the coating section 21 comprises at least one fenestration, such as a round or square or other shaped hole or a rectangular slot, to accommodate an outflow of liquid resin. In various embodiments, the top 213 of the coating section 21 comprises a plurality of holes, such as arranged in a uniform array, with the holes spaced apart evenly. In various embodiments, the top 213 of the coating section 21 may comprise a screen mesh having a plurality of round holes, discussed in more detail herein below. The screen mesh comprises a plurality of holes that accommodate a flow of resin from the internal reservoir 214 when the reservoir 214 is pressurized.

In various embodiments, each hole in a plurality of holes configured in the top 213 of the coating section 21 can be about 0.35 mm$^2$ to about 0.5 mm$^2$ in open area. For example, round holes may be about 0.7 mm in diameter, or square holes may measure about 0.7 mm×0.7 mm, with distances between evenly spaced apart holes about 1.1 mm. These dimensions are not meant to be limiting in any way. As explained below, hole size and mesh patterns can be optimized for a particular resin, based on the viscosity of the resin. The design of the screen mesh top of the coating section partially determines distribution and output of resin as well as the efficiency of the clean-out process. Other factors influencing efficiency of clean-out of the screen mesh include viscosity of the resin and the temperature. In various embodiments, fluidic pressure of liquid resin to the top 213 of the coating section 21 may be regulated such that a resin height of from about 0.05 mm to about 1.5 mm is seen rising out from each hole in the plurality of holes.

In various embodiments, a foam, entangled fibers, nonwoven pad, or open cell material like a sponge, may be configured beneath the openings of the screen mesh top 213 so as to evenly diffuse liquid resin material before entering the openings configured in the top 213 of the coating section.

In various embodiments, pump pressure delivered to the screen mesh fills each of the holes in the screen mesh with uncured resin. As mentioned, it is preferable to pump as little resin as possible into the screen mesh but still an amount sufficient to recoat the whole layer to a given layer thickness (e.g., 50 μm or 100 μm). In certain aspects, a filled screen mesh will appear to have raised droplets of liquid uncured resin in each hole of the screen mesh, crowning each hole. To pressurize resin present in the reservoir 214 of the coating section 21, an opening can be configured in the bottom of the coating section 21, or through the side panel 29. In general, with a pressure applied to the reservoir 214, resin contained therein will squeeze out through the at least one fenestration (e.g., holes in the screen mesh) configured in the top 213 of the coating section 21.

In relation to the viscosity and Young's Modulus of the liquid material, when the liquid pressure in the coating section reaches a certain level, the material permeates through the small holes of the screen mesh. When the build platform passes over the screen mesh from above, the permeated liquid material on the screen mesh will be coated on the bottom of the build platform or on the previously printed layers. The permeated material height residing on the screen mesh of the coating section is determined by the surface tension of the material, hole size, and the pressure of the liquid material. Increasing the pressure will increase the material height permeated out the screen mesh. In various embodiments, the pressure within the coating section of the printhead can be dynamically controlled by a pump, so that the permeated material height can be adjusted by the pump settings. Therefore, the printhead can control the volume of the coated material on the top surface of the coating section. In various embodiments, liquid material is pumped into the coating section with a fluidic pump. In other embodiments, the coating section may be filled with liquid resin and a pressure pump (e.g., an air compressor) is used to apply pressure to the material contained in the coating section.

FIG. 3 illustrates embodiments of resin dispensation from the coating section 31a of a printhead device 30 in accordance with the present disclosure. The lower illustration is a cross-sectional view of the printhead 30 when cross-sectioned along the x-axis, whereas the upper illustration is an expanded view of only the upper portion of the coating section 31a. In various embodiments, the coating section comprises a top face 310 having at least one fenestration 311. In some examples, the top face 310 comprises a screen mesh having a plurality of holes 311. As indicated, the coating section 31a contains curable resin material 312 under fluidic pressure. Depending on the variables mentioned (viscosity, Young's Modulus, pressure, and the size, number and distribution of fenestrations in the coating section), the liquid resin will be pushed out of the openings 311 to a measured height 314. This height 314 (otherwise referred to as the liquid resin coating thickness) is preferably exactly, or at least substantially equal to, the fabrication layer thickness. In various embodiments, this thickness is preferably from about 0.01 mm to about 0.25 mm. Therefore, only a small amount of liquid resin will be coated in a layer prior to curing.

FIG. 4 sets forth just three examples of fenestrations that can be configured into the top surface of the coating section of a printhead device according to the present disclosure. The top surface 40a depicted in (a) comprises a screen mesh further comprising a plurality of holes 410. The top surface 40b depicted in (b) comprises a series of slot openings 420. In these embodiments, the number and width of the slots can be adjusted to achieve a desired output of resin. Lastly, the top surface 40c depicted in (c) comprises just a single slot 430. Fenestrations, such as those depicted in the top surface configurations 40a, 40b and 40c, are optimized in size, number, and distribution pattern for the particular object being 3D printed, the size of the layers to be fabricated (e.g., as determined by slicing software), the pressure to be applied to the coating section of the printhead to force the resin from the fenestration(s), and the physical characteristics of the liquid resin material to be distributed from the fenestration(s).

Curing Section

With reference again to FIG. 2, the curing section 22 of the printhead 20 may be configured as an open space 217, although the curing section 22 can include a transparent cover 212. The cover 212 is configured to be UV transparent, such that a curing light source from below can project up through the cover 212 and project onto a resin layer previously coated by the coating section 21. The light source to be aligned with the curing section of the printhead device is described in more detail below under optics.

In various embodiments, the transparent top cover 212 may comprise simple transparent glass or plastic, or a lens or a light filter, so as to manipulate the incident light from below before the light is projected onto the coated layer adjacent to and above the cover 212. In various embodiments, the top surface may further comprise a non-sticky film, such as Teflon applied to the top of the transparent glass cover, to ensure that the newly cured line segments can be detached from the printhead and attached to the previously built layers.

The bottom of the curing section may also comprise a transparent panel such as glass or plastic, a lens or a light filter, or it may be left open. The space 217 within the curing section may comprise nothing, or it may comprise a solid block of transparent material. Stated another way, the curing section 22 may comprise a solid block of transparent material that contiguously includes the top surface 212. In other embodiments, a front a back supporting structure allows the curing section to be completely open, that is, without any cover 212. In other words, a configuration for the printhead is contemplated where the coating section 21 is connected to the cleaning section 23 by just two structural elements configured in parallel and perpendicular to spacers 27 and 28.

With continued reference to FIG. 2 and both the coating section 21 and curing section 22 of the printhead device 20, the spacer 28 configured therebetween can optionally comprise at least one channel to provide a passageway for excess resin to move from a location above the printhead device to another location.

Cleaning Section

With continued reference to FIG. 2, the cleaning section 23 of the printhead device 20 comprises at least one fenestration 211, configured as one or more openings through the top surface 215 of the cleaning section 23 and providing a passageway into an open area 219 in the cleaning section. In preferred embodiments, the at least one fenestration 211 comprises one, two, three, four, or more, elongated slots running parallel to one another and perpendicular to the x-axis along which the printheads will be moved. As detailed below, these fenestrations, preferably slots, function as vacuum ports when a vacuum is applied to them from below. These vacuum ports 211 function to suck uncured resin from a previously cured resin layer on the part being printed. The size and distribution of these slots are described below, but in general, it is preferably to have about three vacuum slots 211 configured in progressively narrower widths, although only two slots 211 are illustrated in FIG. 2. Each successively narrower slot provides a more intense and focused vacuuming. The width of the slots range from about 50 μm to 1 mm. Typically a first vacuum slot with a larger width will vacuum out most of the uncured liquid resin, and then a second and a third slot will further clean the uncured material with their more focused vacuuming. As illustrated, tubing 218 may be used to connect each one of the fenestrations 211 to a vacuum pump, although in simpler configurations, the space 219 within the dimensions of the cleaning section 23 can be placed under vacuum, and only a single port configured in the bottom of the cleaning section 23 need be connected to a vacuum pump. Individualized vacuum connections, however, allow different negative pressures to be applied to each fenestration. The physics of the vacuum-based cleaning is discussed below.

Post-Curing Section

Moving now to the post-curing section 24 of the printhead device 20 in FIG. 2, this section of the device, as mentioned, is optional. If not incorporated, the printhead device 20 can simply end in width after the cleaning section 23, with structure 26 representing one side of the device. However, if included in a printhead, the post-curing section 24 is configured substantially similar to the curing section in that the cover 210 to the section is a transparent element, or is not present at all. The curing light source for the post-curing section is projected up through the post-curing opening 216, much like the light source for the curing section 22. As needed, the space 216 can be an entire block of transparent material, a light filter or lens setup. In various embodiments, transparent glass can be used as the top surface of the curing and post-curing sections, so the light from the bottom of the printhead device can penetrate through the transparent glass and project onto the resin to be cured.

Printhead Functional Design Considerations

In various embodiments, a printhead device 20 herein may comprise a substantially flat top surface disposed contiguously across the coating, curing, cleaning, and, if present, the post-curing sections of the device, such as inferred from the illustration in FIG. 2. The upper surface of the printhead device is that surface that will be closest in proximity to the part being printed, as opposed to the opposite side of the printhead device, which can be mounted to a movable stage. In various aspects, the flat top surface of the printhead device comprises the top surfaces of each of the coating section, cure section, cleaning section, and, if present, the post-curing section, such that the top surface of each of these sections are relatively coplanar. In various embodiments, a single piece of material forms the contiguous top surface, which is fabricated differently as needed to accommodate the design differences in each of the sections. In various embodiments, each of the sections of a printhead device are fabricated with separate top surfaces but those top surfaces are aligned to be coplanar. In other illustrated embodiments, sections of the printhead device may be disposed at different heights such that the collective top surfaces of each of the sections of the printhead are not coplanar.

To ensure all printheads in a multiple series of printheads have a flat top surface to be aligned within a layer thickness, multiple printheads can be fabricated using a single transparent acrylic sheet or piece of glass or other material previously configured with vacuum slots and resin distribution holes as necessary for the coating and cleaning sections. The flat top surface and all of the necessary fenestrations across all the printheads can be machined together.

With reference now to FIG. 5, an alternative functional design of a printhead device is illustrated, wherein the top surfaces of each of the various sections of the printhead are not coplanar. The illustration in FIG. 5 is a cross-sectional representation of a printhead 50 in accordance with various embodiments of the present disclosure.

As shown in FIG. 5, the top surfaces of the post-curing section 514 and the cleaning section 513 of the printhead may be displaced in the z-direction from the top surfaces of the coating section 511 and curing section 512 of the printhead. In various embodiments, the top surfaces of the coating section 511 and the curing section 512 are coplanar. In various embodiments, the top surface of the cleaning section 513 is offset in z-direction height by distance 516 from the coplanar top surfaces of the coating section 511 and cleaning section 512. In various embodiments, the top surface of the post-curing section 514 is offset in z-direction height by distance 515 from the coplanar top surfaces of the coating section 511 and cleaning section 512. In various embodiments, the distance 515 is equal to the distance 516, meaning that the top surfaces of the cleaning section 513 and the post-curing section 514 are coplanar. In other embodiments, the distance 515 is not equal to the distance 516, meaning that the top surfaces of the cleaning section 513 and the post-curing section 514 are not coplanar, yet both are offset in height to the coplanar top surfaces of the coating section 511 and cleaning section 512.

In various embodiments, the offset distance 516 for the cleaning section is 0 mm to about 2 mm. This height difference between the cleaning section 513 and the curing section 512 ensures that only the curing section directly contacts the built layers, and the other sections of the printhead will not directly contact the printed layers, which can protect the newly cured part from contacting other sections.

In various embodiments, the offset distance 515 for the post-curing section is 0 mm to about 10 mm. This height difference between the post-curing section 514 and the curing section 512 ensures that there is no contact between newly cured features on the part being fabricated and the post-curing section.

Light Source and Optics System Design

In various embodiments, a light source herein comprises an LED, a UV lamp, an infrared lamp, a visible light lamp, a laser, etc. The light source may be part of an optics system that includes various optical elements such as lens and mirrors.

FIG. 6 illustrates various embodiments of an optics system usable in conjunction with a laser light source 314 configured underneath the curing section 62 of a printhead device during 3D printing. In this exemplary design, a one-dimensional F-Theta lens 613 is added in the laser scanning optics to produce a focused cure line 615 along the linear scanning line 614. The F-theta lens 613 is key to ensuring the printing accuracy can reach as high as 600 dpi. The optics system further comprises a culminating lens 611 and an x/y-galvo mirror 612 to direct the laser light to the F-theta lens 613 where the light is focused into the linear scanning line 614.

In the current prototype discussed below in the experimental section, the overall scan length is 75 mm, which incorporates 4096 dots in total. Hence the size of each dot is around 18.4 µm, equating to the scanning accuracy of the prototype system. In comparison, in droplet/extrusion-on-demand-based printers, the printing resolution is determined by the nozzle size, which limits the printing resolution as well as the material choice. A trade-off among resolution, material choice, and cost must be made in the droplet/extrusion-on-demand approach.

In various embodiments, resolution is mainly determined by the laser spot size and scanning resolution. As mentioned before, the laser scanning system that is required to scan along a single line can easily achieve the resolution of a few microns as shown in FIG. 6.

Conventional laser-based SLA printers utilize a two-dimensional scanning field. Two-dimensional F-Theta is much more expensive than the one-dimensional F-theta lens used experimentally herein. Because of the high cost of two-dimensional F-Theta, conventional SLA printers do not incorporate F-theta lens in their optics, which results in unacceptable distortion at the corner of scanning field, greatly limiting printing accuracy and area size. The usage of one-dimensional F-theta lens is one key point herein to fabricate high-resolution features with low cost. In addition, another cost-effective factor is that the multi-material printing herein does not involve small nozzles. Hence, material selection is not limited by viscosity and resin flow parameters.

FIG. 7 illustrates an alternative curing optics system design using a digital micromirror device (DMD) comprising an LED 711 as the light source for the printing apparatus. In various embodiments, the DMD comprises a culminating lens 712 and a digitally controlled micromirror array 713, such as, for example, a 1920×1080 array of aluminum, micrometer sized mirrors (DLP9500 DLP® from Texas Instruments). Each micromirror in an array for DMD can be individually switched ON/OFF. Different combinations of ON/OFF states for each micromirror generates different patterns (e.g., 714a on pixel/714b off-pixel), and these patterns pass through a group of lens 715 and eventually project different images on the focusing planes. These focused images are utilized to cure the photo-curable material into the cured pattern 710 matching the on-pixel image 714a.

In general, the aspect ratio of the projected image depends on the aspect ratio of the DMD chips, for example, 16:9 or 4:3. However, in various printhead embodiments, the curing section may have a long-narrow aspect ratio. For example, the width of curing section can be set to 10 mm, while the length of the curing section can reach 100 mm, resulting in an aspect ratio of 10:1. In various embodiments, two techniques are usable to change the original 16:9 or 4:3 aspect ratio to the required long-narrow aspect ratio. The first technique is using only a subset of the pixels. For example, the DMD chips have 1920 rows and 1080 columns, and only the central 200 columns are used so that a 10:1 aspect ratio is reached. Another technique is adding a cylindrical lens in the optics, such as cylindrical lens 716 depicted in FIG. 7.

A cylindrical lens is an optical component that can shrink the image only in one direction. In various embodiments, the width of the image will be reduced, so that a long-narrow image can be projected. Although both techniques work, the latter one makes full use of the energy from LED 711. Of note is that the DMD-based curing optics such as illustrated in FIG. 7 only supports a sequential curing strategy (discussed herein below), which means the printhead must stop before the image can be projected to the curing section.

In various embodiments, an optics system may comprise a digital micromirror device (DMD), a liquid crystal display or a scanning-mirror-based laser. In various embodiments, an optics system herein, comprising the light source, is controlled by program instructions encoded on a computer-readable medium such as a computer hard drive.

Additional Multi-Material 3D Printing Apparatus Configurations

FIG. 8 illustrates various embodiments of a multi-material 3D printing apparatus 800 in accordance with the present disclosure, comprising the various elements detailed above, so that a configuration of a working apparatus can be appreciated. In general, the apparatus consists mainly of an infrared projection system, multiple convertible printhead devices, a printing build platform, and an infrared thermal sensor for real-time temperature detection.

The apparatus 800 illustrated comprises two printhead devices, a first printhead device 80a and a second printhead device 80b, movable in an x-axis shown by bolded arrows. The apparatus further comprises a build platform 801 configured to move in a z-direction and carry a 3D part being fabricated layer-by-layer on the underside 802. The apparatus 800 also comprises a light source 803, and a non-transitory computer-readable medium encoded with program instructions for controlling the printhead devices, the build platform, and the light source to perform the C3P process of multi-material 3D printing disclosed herein (the computer controller is not illustrated). In this example, the light source 803 is part of a DMD optics system that includes light steering optics 804 and a micromirror array 805 such as the DLP9500 DLP® array from Texas Instruments. In the illustration, the first printhead 80a is registered under the part being printed, and thus the printhead currently applying and curing a layer of material on the part being fabricated.

As discussed thoroughly herein, each printhead device 80a/80b comprises a coating section 806, a curing section 807, a cleaning section 808, and a post-curing section 809. The corresponding sections in the first printhead device 80a are not labeled so as not to crowd the drawing, but it should be understood that each of the structural elements can be the same in both printhead devices 80a and 80b. The coating section 806 comprises a screen mesh top from which liquid material can be distributed. The cleaning section 808 comprises two vacuum slots. The second printhead 80b is further marked-up to show a fluidic pressure inlet 810 into which a material can be pumped so that it distributes out the screen mesh at the top of the coating section under pressure. Alternatively, the coating section is filled with material and the inlet 810 is where pressure is applied, such as compressed air. A vacuum system is configured from the cleaning section 808, through the coating section 806 by way of the vacuum tubing 812, and out to the vacuum outlet fitting 811. Routing the vacuum cleaning feature in this way allows for recycling uncured resin from the part being printed from the cleaning section 808 to the coating section 806. This recycling feature is optional, and it might be that the vacuum tubing 812 is routed through the coating section without fluidically connecting to it. Such an arrangement places the two ports 811 and 810 in close proximity to one another for a simpler design.

For curing of an applied layer, a light source 803, such as a laser, LED, infrared, or white light source provides a light beam 813 that is focused through illumination optics 814, manipulated through light steering optics 804/805, and lastly through imaging optics 815, to be projected as a light image 816 up through the curing section of the printhead device where the light cures the previously applied layer. In various aspects, the projected light 816 comprises a 2D image so that the newly coated resin area can be selectively cured into a thin layer of risen representing the 2D sliced shape. The post-curing aspect can have its own separate light source 817 to provide a curing light 818 projected up through the post-curing section of the printhead device 80b.

In addition to photocuring multiple liquid resins with a light source, curing and post-curing sections can also use infrared or visible light to raise the temperature of a desired portion of a coated thermoset polymer such that the related portion will be thermally cured into a solid state. In other embodiments, combinations of photocuring and thermal curing can be used. In various embodiments, an infrared thermometer 819 can be positioned to monitor the temperature of the curing and/or post-curing steps. In various embodiments, the light source 803 may be configured to project infrared (750 nm to 2 μm) or visible light (400 nm to 750 nm) instead of UV or blue light (350 nm to 450 nm). IR and visible light provide energy to raise the temperature of liquid thermoset polymers such that the polymers are solidified after a period of time. Similarly, a powerful IR or visible lamp can be used in the post-curing section to raise the temperature of any residual resin not previously cured or vacuumed off.

Coating, Curing, Cleaning, and Post-Curing 3D Printing Process ("CP3")

As mentioned, an aspect of the present process is to effectively remove uncured resin right after the selective photocuring of applied resin. A well-designed printhead is critical to increasing printing efficiency, enhancing resin cleaning performance, and eliminating contamination between different materials. In general, the present process provides a significant advantage over a typical mask-image-projection-based additive manufacturing process in that the process disclosed herein uses the controlled coating of a small amount of resin, so the material cleaning is more effective and more manageable. Besides, a post-cure procedure after the cleaning step ensures no material contamination between different printheads.

As illustrated, for example, in FIG. 9A, the overall 3D printing process 900 according to the present disclosure comprises the steps of coating 901, curing 902, cleaning 903, and optionally post-curing 904. These steps are repeated for each layer created in this additive material (AM) process until the finished part is obtained. Each printhead device is configured to enable these four steps, and printheads are moved in step 905 until each of the desired layers are printed. Movement of the printheads comprises registering the chosen printhead device under the part being printed such that the material in the registered printhead can be applied, cured, cleaned off, and optionally post-cured.

A multi-material printing apparatus for carrying out the multi-material 3D printing process is exemplified in the illustration of FIG. 9B. Each printhead device (Print Head 1, Print Head 2, Print Head 3, and so forth) may provide a unique material for the multi-material printing. For example, three (3) printhead devices as illustrated may be arranged linearly in a multi-material printing apparatus to support printing of three different materials. In various embodiments, the platform of the multi-material printing apparatus may move up and down in the z-axis as shown by the arrow, perpendicular to the linear arrangement of the multiple printhead devices that are movable along an x-axis as shown. The apparatus further comprises a light source and optics system, such as DMD. Each printhead is configured with a pump inlet and a vacuum outlet. The part 920 being printed grows layer-by-layer as each printhead performs its task of coating, curing, cleaning, and optionally, post-curing.

In various embodiments, the process is carried out by computer instructions. In various embodiments, a non-transitory computer-readable medium is encoded with program instructions for controlling at least one printhead device, a build platform, and a light source in a multi-material 3D printing apparatus such as illustrated in FIGS. 1, 8 and 9B to perform the process of multi-material 3D printing illustrated in FIG. 9A and referred to herein as C3P.

The DOD Multi-Material 3D Printing Process

A multi-material 3D printing process in accordance with the present disclosure comprises the following process steps as illustrated, for example, in FIG. 9A:

Coating

In the first step 901 of the process, a layer of photocurable material is coated onto the platform of the apparatus or onto a previously built layer of the part being 3D printed. For this step, the coating section of a printhead device containing the material to be applied is positioned under the platform or under the previously built layer of the growing part such that the material can be applied to the target area. The printhead device may be moved during this process so as to coat a layer having a surface area greater than the surface area of the coating section of the printhead. In various embodiments, a pump may be used to apply pressure to the uncured material in the coating section of the printhead device, so as to move material into the fenestrations provided in the top surface of the coating section. Unlike a deposition-on-demand method, an entire liquid resin layer is coated in the C3P process regardless of the designed shape of the layer being printed.

In various embodiments, a curable material to be distributed from the coating section of a printhead device may be a single homogeneous material, such as a single color of a photocurable resin. In other embodiments, two or more materials may be combined in the coating section. For example, Material A and Material B, both being liquids, may be pumped into a mixing valve prior to being pumped into a coating section of a printhead device.

In various embodiments, an ideal coating thickness of liquid resin is substantially equal to the fabrication layer thickness (usually between 10 µm to 250 µm). To achieve this goal, the configuration of the aforementioned screen mesh of the coating section is based on the surface tension of the liquid curable resin to be distributed from the screen mesh. As mentioned, a coating screen mesh with small holes can be used as the top surface of the coating section. Due to the surface tension of the liquid resin, the resin permeates through the small holes when the liquid pressure applied to the screen mesh reaches a certain level. When the platform passes through the mesh screen from the above, the permeated liquid resin will be coated on the bottom of the previously printed layers and between the gaps. The layer thickness is controlled precisely by the linear Z stage, not by the amount of liquid resin permeated from the screen mesh. By controlling the pump pressure (by adjusting, for example) the speed of a stepper motor for the pump), about 0.3 mm to 0.5 mm resin is permeated through the mesh screen that is then coated on the previously built layers with a set layer thickness (e.g., 50 µm or 100 µm). The permeated material height is determined by the surface tension, hole size, and liquid resin pressure. Increasing the fluid pressure will increase the permeated resin height.

In various embodiments of the printhead, the pressure can be dynamically controlled by a pump so that the pump settings can adjust the permeated resin height. Therefore, the printhead can control the volume of the coated material, and only a small amount of liquid resin will be coated and used in the curing section. The extra resin will flow into channels configured between the coating and curing sections and sucked back to a resin reservoir configured in the printhead device.

Curing

In the second step 902 of the process, the printhead device is moved along an x-axis such that the curing section of the printhead device is now positioned under the newly applied layer. A light source within the multi-material printing apparatus irradiates the newly coated layer to selectively cure it. In various aspects, a digital micromirror device ("DMD") may be used to project a 2D image onto the newly coated resin area, wherein a thin layer of the resin is selectively cured into the projected 2D sliced shape. In general, the light source will be a UV lamp or a laser, configured to emit the wavelength radiation required to cure the particular photocurable resin.

After the platform or the previously built layers (including designed supports) are coated with liquid resin slightly higher than the layer thickness, the printhead is moved to the curing section and stops in this position during the curing process. A masked image is then projected upwards through a transparent glass with a coated non-sticky film to the curing section. The coated liquid resin will be photocured according to the projected image pattern. Hence, this photocuring can fabricate the desired shape before the platform moves to the next section.

In various embodiments, a controlled laser spot is used to dynamically scan a line on the curing section. Accordingly, the coated liquid resin will be photocured according to the laser ON/OFF status. Hence this photocuring can generate a set of line segments before the platform is moved towards the next section. At least the following two curing strategies can be used in accordance with the present disclosure:

Sequential curing: In sequential curing, the platform moves for a certain distance and stops, and then the laser module will begin to scan the desired pattern inside the area that is exposed in the curing section. After finishing the scanning, the platform moves a certain distance so that another segment of part area can be selectively cured. This sequential curing continues until the entire layer of material has been photocured. The curing width of each laser scanning ranges can be from about 0.5 mm to about 10 mm.

Parallel curing: In parallel curing, the platform moves continuously, and the laser scans simultaneously with the movement of the platform. In this case, the laser constantly scans one single line on the curing section, and the platform continuously moves so that the entire layer will be covered line by line. The curing width of the laser scanning is the width of the laser spot, ranging from about 0.01 mm to about 1 mm. Hence the width of the curing section ranges from about 0.01 mm to about 10 mm.

Cleaning

In the third step 903 of the process, the printhead device is moved further along the x-axis such that the cleaning section of the printhead device is now positioned under the newly cured layer. A vacuum is applied to the cleaning section of the printhead device to remove uncured material from the coated and cured layer. When configured as such, the cleaning section of the printhead device enables cleanout of the coating section of the printhead device when the vacuum is applied.

Since a 3D printed object may comprise delicate features, contact of the photocured layers with the printheads may destroy the newly printed features. The cleaning section enables a non-contact cleaning using a vacuum pump. In various embodiments, the cleaning section is connected to a vacuum pump via a sealing pipe or other suitable fitting configuration. The vacuum pump provides a negative pressure compared to the atmospheric pressure on the top surface of the cleaning section. Consequently, this negative pressure causes the uncured liquid resin to be sucked out from the photocured layers of the 3D printed part.

As mentioned above, elongated slots or other suitably designed fenestrations are configured into the cleaning section of the printhead device. For example, several small slots with different sizes can be configured on the top surface of the cleaning section. In various embodiments, slots configured in the cleaning section may be elongated in the x-direction, perpendicular to the x-axis along which the printheads are moved. A cleaning section may comprise one or more, such as two or three, elongated slots that can be placed under a vacuum. As suitably configured, slots enable an increase in vacuum force. For example, a first vacuum slot with a larger size can suck out most of the uncured liquid resin, with sequentially narrower slots utilized to clean the remaining uncured material. Generally, additional slots of more than five have little effect on further removing residual material. Under vacuum, the amount of residual liquid resin on the printed layers is related to the speed at which the printheads are moved, the size and number of slots, the distance between the vacuum slots and the printed layers, and the magnitude of the applied vacuum.

When a cleaning section is configured with more than one slot, and the slots are of decreasing width, the printhead can be moved in a stepwise fashion such that the slots are sequentially positioned under the part, beginning with the widest slot and sequentially progressing to the narrower slots. The first position is where the widest slot is under the part, resulting in removal of the majority of the uncured resin. Then the next position is where the second widest slot is under the part, and so forth, until the narrowest slot is positioned under the part last.

In various embodiments, uncured resin vacuumed from a part during printing is recycled rather than wasted. For example, uncured resin can be recycled into a material reservoir. In various embodiments, each printhead may be connected to a recycle pump to pump the liquid resin from an initial collection area into the material reservoir. Solvents can be used as necessary to clean these components.

Post-Curing

In the optional fourth step 904 of the process, the post-curing section of the printhead device, if present, is properly positioned and engaged to solidify any residual material after the vacuum-cleaning step. This post-curing step is optionally performed to ensure no liquid uncured material remains on the previously printed layers, thus mitigating any material contamination between different printhead devices in the multi-material printing apparatus. In various aspects, post-curing may comprise a high intensity UV light.

A small amount of residual liquid uncured resin may still be present after the vacuum-cleaning process enabled by the cleaning section of the printhead. To ensure no contamination between different liquid resins when switching to another printhead, a post-curing section in the final portion of the printhead can be engaged to fully cure and uncured resin remaining on the printed layers of the part before other types of resins contact the printed layer. This post-curing step can use various kinds of light sources, such as a digital light processing (DLP) projector, multiple light-emitting diodes (LED), or a laser scanning module. The post-curing section conducts a second light exposure to the printed layers.

In various embodiments, exposure of the residual liquid resin to post-curing may lead to an additional 10% or so of cured materials (e.g., instead of 100 µm layer thickness, the printed layer may have, for example, a 110 µm thickness). Photocuring residual liquid resin after vacuum-cleaning ensures no contamination exists between different printheads in the layer-by-layer fabrication process.

Engaging Sequential Printheads

As illustrated, for example, in FIGS. 9A and 9B, after a first printhead device finishes the aforementioned four steps 901, 902, 903 and 904 of the C3P process, a second printhead device is moved into position in step 905 to repeat the four steps, adding a second type of material to the same layer.

FIG. 9C further illustrates the overall process of building layers through repeated steps of coating, curing, cleaning, and post-curing. When each of the multiple printhead devices present finish the C3P printing process of the layer, the printed layer will comprise multiple materials in controlled shapes. The printing platform is operable to raise a layer thickness, and this procedure can be repeated layer by layer to create a 3D printed object having the designed material depositions. In the scenario illustrated in FIG. 9C, three printheads, each with a unique material, are engaged in printed the printed part at right, layer-by-layer, beginning with a designed pattern of a layer at left.

Computer Processing Unit and Process Instructions

Multi-material 3D printing in accordance with the present disclosure is necessarily a computer controlled process. As such, a non-transitory computer-readable medium is encoded with program instructions, (i.e., software), that control the at least one printhead device, the build platform, and the light source, to perform a process of multi-material 3D printing referred to herein as C3P. In various embodiments, additional program instructions will control further aspects of the multi-material 3D printing apparatus and C3P process, including, but not limited to, a multistage platform associated with the at least one printhead device, a fluidic pump, an air compressor, a vacuum pump, miscellaneous ports and valves, x/y/z-positions of various lens and mirrors, ON/OFF switching within micromirror arrays of a DMD system, post-curing light source, along with various temperature sensors, cooling fans, positioning sensors, and so forth.

In various embodiments, a computer, otherwise referred to as a computer processing unit or "CPU" is the overall hardware for running the non-transitory computer-readable medium on which the software is encoded. In various embodiments, the non-transitory computer-readable medium comprises a hard drive within the computer. The program instructions, or process software, includes software that converts CAD drawings into 3D printing instructions. At the core of these instructions is so-called "slicing software" that digitally cuts up a 3D CAD image into layers that, when sequentially printed by the multi-material 3D printing apparatus, produce the desired 3D part.

In various embodiments, a computing unit comprises hardware, such as a computer-readable medium, and software instructions on the computer-readable medium, along with the necessary connections (hardwire/USB or wireless) to the other units in the apparatus, such as the printhead devices and multistage platform to move them, the build platform, the light source and optics system, and so forth. In particular, the computing unit can communicate with and control the printhead devices, build platform and light source by the appropriate hardwire/USB or wireless connections. Computing hardware may comprise a computer running on any platform, further comprising a CPU, memory (e.g. RAM and ROM), keyboard, monitor, mouse and peripherals as needed. In various embodiments, the computer comprises a non-transitory computer-readable storage medium encoded with instructions that, when executed by a processor in the computing unit, cause performance of specific processing steps, such as to move printhead devices laterally, move a build platform vertically, force resin under pressure into a printhead device, turn on a vacuum pump or open a valve, and so forth. In this way, through program instructions encoded on a non-transitory computer-readable storage medium, the computing unit controls the functions of the other units of the multi-material 3D printing apparatus, including the printhead devices, the build platform where the part is being fabricated, and the light source for curing photocurable resin. In broader terms, the computing unit comprises a non-transitory program storage medium having program instructions for controlling the various units of the multi-material 3D printing apparatus to perform the process of 3D printing described herein.

FIG. 10 provides an example of how a model was represented in the multi-material SL process of the present disclosure. The figure provides an illustrative pipeline of slicing a three material model to obtain program instructions for fabricating the multi-material object shown. For the desired part shown, which is defined with three STL models in part (a), each STL model was first sliced. The resulting mask images for each STL were the reassembled into a single color image file (BMP) at each layer. These BMP images represented the material distributions and were used to generate the mask images for each printhead. Besides slicing from the STL models, digital images such as these can be directly created using any one of many design packages.

In FIG. 10, the given CAD design (b) contains 3 STL models (a), and each STL model needs to be fabricated with one unique material (such as one particular color of a resin). All three STL models were sliced using the same layer thickness. The sliced results at each layer were combined to construct a single BMP image. Each R/G/B channel in the BMP images represent one material. The BMP images of all layers are shown in (c). During the fabrication of each layer, the corresponding BMP image's RGB channels are extracted to form three different projection mask images. An example layer is shown in (d), and each mask image is used to cure the corresponding liquid resin. The 3D-printed object is shown in (e).

Methods of Representing a Multi-Material Model

The input of the developed multi-material SL process is a digital computer-aided design (CAD) model. However, unlike a 3D printing process using a single material, some novel representation methods are required to define a 3D object with multiple material composition. A valid multi-material representation method should uniquely define the material information at any position in the 3D CAD model.

In various embodiments, a C3P process in accordance with the present disclosure requires one mask image for each material at each layer. For this purpose, two different model representations can be used:

Separate STLs: An exemplary representation method is to use different STL models to represent each material and then plan the mask image for each printhead accordingly. Each STL model will be individually sliced into a set of mask images for the layer-based fabrication process.

Color images: C3P processes in accordance with the present disclosure can also accept a series of color images. The printing process regards each color image as one layer. Given the thickness of each image and the actual size of each pixel, the 3D printer can map the color image to a building range. Four channels of the material information can be extracted from one image's RGB and alpha channels. And each channel information (i.e., red, green, and blue) is used to define the mask image for its corresponding printhead.

Voxel representations: Another general method is to represent a 3D model using voxel representation. Each voxel stores its own material information. Accordingly, the tool path for each printhead can be planned.

Software Systems

In various embodiments, a software system uses C++ to control the C3P-based multi-material SL process. The software system controls all the components of the multi-material printing apparatus, including the light source (e.g., a projector with a DMD chip), a vacuum pump connected to the cleaning section of each printhead device, a liquid resin coating pump connected to the coating section of each printhead device, and a three-axis linear stage.

Exemplary control logic of the software system is set forth as a flow chart diagram in FIG. 11. On the left side of the diagram, a set of preparation processes are performed before the actual printing of a 3D object, including configuring the 3D printing system, initializing the platform position, and turning on the vacuum and liquid resin coating pumps. Afterward, the software system executes a printing loop to fabricate the 3D object layer-by-layer, as shown in the middle of the flowchart diagram, until all the layers have been printed. The right portion of the flow chart diagram shows the detailed C3P processes for each printhead. This sub-loop ends when all the printheads finish the C3P process.

A user interface to a software system is shown as a screen-shot in FIG. 12.

System Calibration and Parameter Setting

In order to improve the performance of the printhead devices herein, mechanical and software calibrations can be conducted in order to finely tune the required parameters. In various embodiments, system calibration and adjustment comprises hardware adjustment of flatness and initial position. A scanning module may be incorporated to synchronize two materials and to perform anti-distortion scanning. Exposure dosage (e.g., light duration) is adjusted to optimize curing lines. Finally, liquid delivery is adjusted by at least regulating the material pump pressure.

System Configurations

There are many possible configurations regarding a system comprising the presented printheads configured to perform the C3P printing method.

In various embodiments, a system comprises a computer processor, an XY linear stage, a Z linear stage, a platform, and an assembly of multiple printheads, such as illustrated in FIG. XX. All the printheads can share a vacuum pump, or each printhead can be assigned an independent vacuum pump. Each printhead requires an individual liquid pump to control the liquid pressure at the coating section. The computer controls and synchronizes the whole system, including the sequence of "coat, cure, clean, and post-cure" of a printhead, the movement of printheads, the on/off status of material coating pump, vacuum pump, recycling pump, and laser scanning.

Number of Printheads

In various system configurations, a multiple printhead assembly includes 1, 2, 3, 4, or more printhead devices. In some implementations, printheads are configured as a single module, except that the liquid resins in their material reservoir are different. In other implementations, the printheads can be designed differently cased on the resins they will use For example, different sized reservoirs, different configuration of the coating screen meshes, different lasers and/or lens in the curing sections and/or post-curing sections, and/or different configurations for the cleaning section (different vacuum slot configurations) are all contemplated.

Printhead Alignment

In various embodiments, printhead devices are configured to move linearly back and forth in an x-axis, various translations in an x/y-plane or circular motion in an x/y-plane. Any movements that cover the whole x/y-plane is contemplated in accordance with the present disclosure. However, two typical configurations are x/y-translation and rotational movement.

3D Printing Direction

Although a bottom-up build sequence is discussed and exemplified herein, it should be understood that the systems herein can be adapted to perform a top-down build of a 3D object.

EXPERIMENTAL RESULTS

Material Vacuum Cleaning Trials and Calculations

FIG. 13 illustrates the basic cleaning operation carried out, in part, by the cleaning section 131 of a printhead device 130, such as when a vacuum is applied to the at least one fenestration in the cleaning section of the printhead device. Recall the purpose of the cleaning step is to remove any remaining uncured resin after a curing step.

A practical setup for the cleaning section 131 of a printhead device 130 is illustrated, for example, in FIG. 13. The at least one fenestration 133 in the top face of the cleaning section 131 may comprise a series of slots, disposed in parallel and perpendicular to the x-axis along which the printheads are moved during the C3P process. Preferably, there are two or three slots, such as configured with progressively narrowing widths. A working setup includes vacuum lines 135a connecting the slots 133 to a vacuum system. The uncured resin sucked from a part being printed is conducted through the vacuum tubing 135a. Multiple lines may converge at connector 134, and the combined uncured resin 138a coming in from each slot may be collected in stopper 137a. The vacuum pump 136a provides the vacuum at the cleaning slots 133. A transfer pump 136b can be used to pump uncured resin 138b into a reservoir 137b through liquid transfer tubing 135c. In this way, resin 138b is available for recycle, such as back into the coating section of the same printhead.

FIG. 14A detail a setup to measure how well a slot configured in the top section of a printhead device can vacuum uncured resin off a part being printed. The figure shows an experimental cleaning section of a printhead device both in (a) perspective view and (b) cross-sectional view. The cleaning section 140 of the printhead is configured with three slots, 141 (the narrowest), 142 (having an intermediate width), and 143, the widest slot. The width of the slots ranged from 50 µm to 1 mm. A bottom port 144 can be connected to a vacuum pump in order to evacuate the internal chamber 145 and cause a vacuum at each of the three slots. FIG. 14B shows the flow of resin 147 vacuumed off the bottom 148 of the part 146, and the mathematics involved as the resin 147 is sucked through the 1 mm widest slot 143 of the three slots 141, 142, and 143 configured in the cleaning section of the printhead. The vacuum cleaning section in the printhead recycles most of the unused liquid resin and determines the Z-resolution of the developed C3P-based multi-material SL process. As a critical step in C3P, various experiments were conducted to enhance its cleaning performance.

A vacuum pump was connected to the vacuum cleaning section of the printhead per FIGS. 14A/14B to remove uncured liquid resin 147 from the part 146. Experiments showed that the cleaning performance was affected by the relative moving speed between the platform and the printhead, the gap 149 between the printhead and the printed part, and the magnitude of the negative pressure. FIGS. 15-17 graphically present how these parameters affect cleaning performance. A test part 146 having surface area A (148) underneath (toward the printhead) was used in this study. The cleaning performance was measured by the thickness of the residual resin left on the printed part. First, the weight of a clean tissue paper ($W_T$) was measured using an analytical balance with resolution of 1 mg. After printing a layer using the printhead, the printed part was thoroughly cleaned using the tissue paper to collect all of the residual resin. The tissue paper was the reweighed to determine weight $W_R$. Hence the weight of the residual resin can be calculated as $W=W_R-W_T$, and the total volume of the residual resin can be calculated based on the resin density ρ. Finally, the height of the residual resin $h_r$ is calculated as $h_r=W/\rho A$. In other words, the thickness of the remaining resin after vacuuming is calculated based on the weight of the resin remaining on the part and the surface area of the part. The plots in FIGS. 15, 16, and 17 show the calculated height of residual material $h_r$ after cleaning with different process parameters, including (d) the printhead moving speed (FIG. 15), (e) the gap 149 between the printed part and the printhead (FIG. 16), and (f) the negative vacuum pressure (FIG. 17). In (d) and (e), the vacuum pressure was set at −180 mmHg; in (e) and (f), the moving speed was set at 3 mm/sec.; and in (d) and (f), the gap 149 was set at 0.1 mm.

When the vacuum-cleaning section with three open slots of sequentially narrowing widths moves close to the built layers containing some uncured resin, the neighboring air will be sucked into the slots due to the pressure difference. Consequently, the moving air will bring a certain portion of liquid resin when moving into the slots. When the air moves faster, or moves for a longer time, more liquid resin will be removed from the attached surface. Experimental data showing the cleaning of Makerjuice® G+ resin is shown in the plots in FIGS. 15, 16, and 17, which verifies the residual material height will decrease when the moving speed decreases, or when the gap decreases, or when the negative vacuum pressure applied increases. Also, the residual material height as small as 10 µm can be achieved (i.e., ~10% for a 100 µm layer thickness). The experimental data is consistent with a previous analysis of the air moving speed and duration. However, it is difficult to derive a quantitative model between the residual resin height with these parameters during the dynamic moving of the vacuum slots, particular when using a configuration of three slots of decreasing width.

It is clear, however, that additional slots of more than five (5) had little effect on further removing uncured residual material. After cured layers are passed through the vacuum-cleaning section, most of the uncured material was removed, and only less than about 10% of the residual material remained.

Rapid Curing Modeling

In the discussion of FIG. 8 above, it was disclosed that curing and post-curing steps in 3D printing may feature infrared and/or visible light as heat sources, in place of photocuring. That is, a multi-material 3D printing apparatus of the present disclosure may comprise thermal curing rather than photocuring of materials used in the 3D printing process. As part of a feasibility study, calculations show that a 100 W infrared pattern projected onto a 100 mm×100 mm×50 µm layer of PDMS can raise the temperature of the PDMS layer from about 20° C. to about 170° C. in 30 seconds. Thus, it is feasible to thermally cure a single layer of polymer using an infrared lamp, rather than photo curing the polymer using a UV lamp.

A Working Prototype Apparatus for Multi-Material 3D Printing

FIG. 18 provides a rendering of various embodiments of a 3-printhead multi-material 3D printing apparatus in accordance with the present disclosure. The apparatus 180 comprises at least one printhead 181 (181a, 181b, 181c, etc.), a build platform 182 configured to move the part 185 being printed at least along a z-axis, a light source 186 configured to cure a photocurable or thermally curable material, and a non-transitory computer-readable medium 183a encoded with program instructions for controlling the at least one printhead device 181, the build platform 182, and the light source 186 to perform a process of multi-material 3D printing. In various embodiment, the non-transitory computer-readable medium 183a is contained within a CPU that also features a user interface 183b such as a monitor, keyboard and mouse. The apparatus of FIG. 18 is configured to print three different materials (represented by the three different textures in the part 185 and in each of the printhead). Each printhead comprises a coating section 301, a curing section 302, a cleaning section 303 and a post-curing section 304. In this configuration, each of the three printheads 181a, 181b, 181c are disposed on a multistage platform 184 capable of moving in an x/y-plane such that the three printheads are moved as a group. Each printhead is shown to further comprise a material delivery and recycling system 401 configured to pump uncured material into the coating section 301, to vacuum uncured resin from the cleaning section 303, and to recycle uncured resin vacuumed off in the cleaning section back to the coating section. Each printhead may be configured with its own individual light source 186. Post-curing may utilize light sources different from the light sources associated with the curing sections of the printheads.

Any number of printheads may be incorporated in a multi-material 3D printing apparatus herein.

A multi-material 3D printing apparatus was built comprising four printhead devices configured to print four different materials, one from each printhead device. In the prototype, a digital light processing (DLP) projector (Acer H6510BD) was used, comprising a DMD chip with 1920× 1080 micromirrors to generate mask image patterns. The projection lens was modified so that the image size at the curing plane was 59 mm×33 mm. An in-house developed C++ software system running in a personal computer (PC) sent a new image pattern to the DLP projector for each layer. The C++ software system also interfaced with a KFlop controller (Dynomotion, Inc., Calabasas, CA) using the USB serial communication. The KFlop controller was used to control all the hardware components, including a vacuum device, four liquid pumps, and two linear stages for the x- and z-axes. The vacuum device was switched ON/OFF by utilizing a relay switch to control the power ON and OFF. The input signal of the relay switch was from a controller's output pin. The four liquid pumps and the two-axis linear stages were all driven by stepper motors. All the six stepper motors were controlled by the KFlop controller with two KStep drivers, which supported 8-axis joint motion.

The screen mesh top surfaces for each of the four printheads were configured as described above and in reference to FIGS. 19B1 and 19B2. That is, each screen mesh comprised a 6×34 array of 0.7 mm×0.7 mm square holes, with distances between the holes being about 1.1 mm. Pump pressure to the printheads was adjusted so that a resin height of about 0.3 mm to about 0.5 mm permeated from the screens. In other embodiments, pressure may be regulated such that a resin height of from about 0.05 mm to about 1.5 mm is seen rising from each hole in the plurality of holes.

Two linear stages from Parker (Cleveland, OH) were used to translate the platform that carried the printed part in the z-axis and the printheads in the x-axis, respectively. The four printheads were assembled on a single frame that was machined from a transparent acrylic plate (from McMaster Carr, Santa Fe Springs, CA) using a Computer Numerical Control (CNC) machine. The single machining operation ensures all of the curing sections of the four printheads have the same height. The screen mesh in each coating section as well as the slots in each cleaning section of the printheads were also CNC-machined. A peristaltic pneumatic pump was used as the resin pump connected to the coating section of each printhead. The pump was driven by a stepper motor whose speed was accurately controlled by the KFlop controller. A vacuum pump (ShopVac QSP 20 Gallon from McMaster Carr) was connected to the four cleaning sections for removing the uncured liquid resin. The vacuum pump was shared by the printheads since only one cleaning section was used at any given time.

The photocurable resin used was MakerJuice® G+(with different colors) from MakerJuice® Labs (Overland Park, KS), formulated for curing with 405 nm wavelength light. The resin had a viscosity of 90 cP @ 20° C., a Young's modulus of 350 MPa, a tensile strength of 62.7 MPa, an elongation of 6%, and a surface tension of 36.5 Dynes/cm. The colors of the liquid resin came from pigments added to each of the resins.

Fabrication Results

A set of freeform 3D objects with two or more materials were fabricated to demonstrate the capability of the developed multi-material SL process. Table 1 shows the typical building time of a layer. The total building time of each layer was 168 seconds to deposit three materials. Among the building time, the curing time of a layer was 23 seconds. Note that this building time is not related to the part shape nor the number of parts to be printed since the mask image of a whole layer was projected in the curing process. If a more powerful light source had been used, the curing time ($t_{cure}$) could be significantly shortened to just a few seconds. Accordingly, the building time of a layer for three materials could be reduced to ~120 seconds. Also, the coating time was set to 14 seconds so that liquid resin could be pumped out in the coating section to coat the previously built layers evenly. It is possible this coating time could also be largely reduced using a pumping system that is more efficient than the peristaltic pneumatic pump used in this prototype system.

Finally, the cleaning and post-curing steps were conducted simultaneously. That is, during cleaning and post-curing, the printhead was continuously moving forward. The post-curing process starts when only a portion of the part is cleaned and moved into the post-curing section; at the same time, the rest portion of the part will continue the cleaning process. Hence, there was no delay nor clear timing boundary between these two steps; accordingly, only the total time of these two steps was recorded and set forth in Table 1.

TABLE 1

| Build time of one layer (in seconds): | | | | | | | | | | | | | |
|---|---|---|---|---|---|---|---|---|---|---|---|---|---|
| Material 1 | | | | Material 2 | | | | Material 3 | | | | | |
| $t_{coat}$ | $t_{cure}$ | $t_{clean}$ | $t_{pc}$ | $t_{coat}$ | $t_{cure}$ | $t_{clean}$ | $t_{pc}$ | $t_{coat}$ | $t_{cure}$ | $t_{clean}$ | $t_{pc}$ | Home | Total |
| 14 | 23 | 14 | | 14 | 23 | 14 | | 14 | 23 | 14 | | 15 | 168 |

In Table 1, "$t_{coat}$" is coating time; "$t_{cure}$" is curing time, "$t_{clean}$" is cleaning time; and "$t_{pc}$" is post-curing time. "Home" refers to the time to translate the printheads back to the home position to print the next layer. Note that "$t_{clean}$" and "$t_{pc}$" occur at the same time.

FIGS. 20A1/A2 and FIG. 20B1/B2 show the successful fabrication of a 3D part comprising two materials 275 and 276, interlaced and spaced in differing width layers, using the prototype multi-material 3D printing apparatus. FIG. 20C illustrates the CAD model 200 used as the basis for the fabrication, with the desired part having small line features ranging from 200 μm to 400 μm interlaced with each other using two types of materials 275 and 276. FIG. 20A1 shows a photograph of a portion of the top of the fabricated part represented by top plan view (a) in the CAD model of FIG. 20C, with FIG. 20A2 providing a drawing of this photograph, showing the first material 275 and second material 276 in spaced apart layers. FIG. 20B1 shows a photograph of a portion of the side of the fabricated part represented by side plan view (b) in the CAD model of FIG. 20C, with FIG. 20B2 providing a drawing of this photograph, showing how first material 275 and second material 276 form a gradient in each column of the printed part. The scale bars 299 in the two photographs 20A1 and 20B1 are 200 μm in length. This fabrication experiment further verifies the residual resin height study.

In FIG. 20A1, the photograph of a portion of the top of the successfully printed 3D part (corresponding to the top plan portion marked "a" in the CAD model in FIG. 20C), it can be seen that the last layer of each material was smooth, as they were defined by the curing section's constrained film. The precise boundary around the small features verifies the cleaning performance of the vacuum-cleaning method. The magnified side view of the finished part in FIG. 20B1 (corresponding to the side view of multiple layers with the layer thickness of 100 μm marked "b" in the CAD model in FIG. 20C) confirms the additional Z height (due to the uncleaned residual resin) is small (within about 10 μm). In viewing the photograph in FIG. 20B1, a slight height difference between the two material segments can be observed, which was caused by a misalignment of the printheads for each material. Adjustment based on a better calibration can address the misalignment issue in future research. The small dips between the two material segments were caused by the under-exposure of the boundary pixels between the two neighboring material segments. Better exposure control can also be the study in future research. As shown in the photographs in FIGS. 20A1 and 20B1, although residual resin existed after the vacuum-cleaning steps, the error due to the fully cured residual resin is barely observable in the printed results after the post-curing steps.

FIG. 21 is a collection of photographs of various parts fabricated by the C3P-based multi-material SL process using the experimental prototype, with the top row of images representing the model used in producing the part. In each of the photographs (lower row of images), the scale bar 210 is 10 mm (1 cm).

FIG. 21 (a) is a test case with a footprint of 30 mm×30 mm×1 mm, and its input model was a BMP image with only red and blue pixels to represent two types of materials, respectively. The projection mask for "red material" was formed by extracting all the pixels with red color. In contrast, the projection mask for "blue material" was those pixels with blue color. The actual size of each pixel was set as 30 μm. This test case demonstrates that the multi-material 3D printing apparatus in accordance with the present disclosure supports the input representation as a set of color images.

Similarly, FIG. 21 (b) shows a part with three different materials. The input was also a BMP image with red, blue, and green colors. Each channel of RGB was extracted to form the mask image to control the deposition of each material. The printed part has a clear boundary between each pair of the two materials provided by the printheads.

FIG. 21 (c) and FIG. 21 (d) show two complex 3D objects with two materials, respectively. The footprint of the test case in (c) is 14 mm×14 mm×15 mm, and the test case in (d) is a cylinder with a 20 mm perimeter and 2.5 mm height. To fabricate each test case (c) and (d), the input to the printer was two separate STL models. Accordingly, two printheads were utilized in fabrication, and each printhead was assigned to build one STL model. After each STL was individually sliced, the sliced patterns at the same layer were assembled into a BMP image with RGB values. When printing, each printhead cured its designed pattern, which was extracted from the assembled images.

FIG. 21 (e) displays a complex example with a footprint of 30 mm×34 mm×1 mm. The layer thickness was set at 100 μm, and there were 10 layers in total. Since the resin used here (MakerJuice® G+) was semi-translucent, the light can pass through the different layers. The color pattern visually observed for the printed part comes from mixing of the refractive colors in the different layers.

Gradient Stiffness Using Hard and Soft Materials

With reference now to FIG. 22, the multi-material 3D printing process of the present disclosure is able to fabricate heterogeneous components with the digital material design using a tensor-based error diffusion method. The designed components with gradient stiffness can then be 3D-printed using the developed multi-material SL system.

FIG. 22 (a) shows a digital pattern to achieve a smooth transit between two different materials. The area with red color indicates that a rigid material will be deposited while the area with green color indicates a soft material will be deposited. The hard material used in this study was Maker-Juice® G+, with Young's modulus of 350 Mpa. The soft material used was Molecule Ink Ra rubber resin (from MUVe, Concord, CA), with Young's modulus of 2 Mpa.

FIG. 22 (a) shows a part with 200 µm small features fabricated on the prototype apparatus without any problems. For smaller features, or features having a larger aspect-ratio, the effect of feature stretching or bending due to the vacuum cleaning process should be investigated further in a future study. FIG. 22 (b) shows a two-material component with a designed digital material distribution to achieve non-symmetrical deformations of the two ears under the same loading force.

FIG. 22 (c) shows tweezers printed with a stiffness gradation. The tips of the tweezers was designed to be soft, in order to grasp fragile objects without breaking them. In c1, the designed Young's modulus distribution is shown with red and blue colors indicating the rigid and soft materials, respectively. Accordingly, the approximated digital material distribution using only two materials (hard material with Young's modulus of 350 Mpa and soft material with Young's modulus of 2 Mpa) is shown in c2. The fabricated multi-material tweezers is shown in FIG. 22 c3. Another printed component having a stiffness gradient is shown in FIG. 22 (d).

Similarly FIG. 22 d1 shows the designed Young's modulus distribution, under the given load (200 N/cm$^2$) and the boundary constraints. FIG. 22 d2 shows the approximated material distribution using only two materials. FIG. 22 d3 and d4 show the mask images used to deposit the hard and soft materials, respectively. FIG. 22 d5 shows the as-printed part with the designed material composition. When compressed, the 3D-printed object deformed to the shape shown in FIG. 22 d6, which is close to the design depicted in FIG. 22 d2. Scale bars shown in d5 and d6 are 10 mm (1 cm) in length.

FIGS. 23A, 23B, and 23C are photographs of parts printed by the prototype multi-material 3D printing apparatus of the present disclosure.

FIG. 23A shows a test case with a footprint of 18.5 mm×22.3 mm×1 mm, and its input model is a BMP image. The laser scanning mask for "white material" is formed by extracting all the pixels whose grayscales are greater than 127. In contrast, the laser scanning mask for "black material" are those pixels with grayscales that are smaller than 127. The actual size of each pixel is set as 18.4 µm. This test case demonstrates that the prototype printer supports images as the input multi-material model representation.

FIG. 23B demonstrates the capability of the prototype printer to handle a wide material choice. This example used two liquid resins of relatively high viscosity (~200 cp).

FIG. 23C shows a part fabricated using a dithering method to generate a large amount interpolated materials among different types of liquid resins. In the photo of FIG. 23C, the very left material is fabricated with "white" material, and the right side material is fabricated with purely "black" material. The material in the middle is a mixture of both "white" and "black" material for different gray scale levels.

CONCLUSION

Effective cleaning of uncured resin was realized with reduced coated resin having height in the sub-millimeter range, along with improved vacuum removal leaving uncured resin less than 10 µm thick. Fast material swapping was achieved using the compact design of the multiple printhead devices.

Table 2 sets forth a comparison of the 3D printing approach in accordance with the present disclosure (marked as "C3P" in the table) with other multi-material 3D printing approaches. "DOD" refers to deposition-on-demand; "COD" refers to curing-on-demand; rel. cost reflects the cost of key components in the process; and "ink-jetting" refers to a Stratasys J750 printer available from Stratasys, LTD. The resolution of DOD is determined by nozzle size, whereas the resolution of COD is determined by the pixel size of the projection image:

TABLE 2

Comparison of 3D Printing Approaches

| Methods | Type | Resolution | Speed | Materials | Viscosity | Rel. cost |
|---|---|---|---|---|---|---|
| Ink-jetting | DOD | 14 µm | Fast | Photo-curable resin | <100 cp | $$$ |
| Multi-nozzle FDM | DOD | 100 µm~200 µm | Slow | Thermoplastic | — | $ |
| Multi-syringes extrusion | DOD | 20 µm~200 µm | Slow | Gel-like material | — | $$ |
| Top-down SLA | COD | 30 µm | Slow | Photo-curable resin | <1000 cp | $$ |
| Bottom-up SLA | COD | 47 µm | Slow | Photo-curable resin | <1000 cp | $$ |
| C3P | COD | 30 µm | Medium | Photo-curable resin | <1000 cp | $$ |

In the detailed description, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent (e.g., integral), removable, temporary, partial, full, and/or any other possible attachment option. Any of the components may be coupled to each other via friction, snap, sleeves, brackets, clips or other means now known in the art or hereinafter developed. Additionally, any reference to without contact (or similar phrases) may also include reduced contact or minimal contact.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like.

Terms and phrases similar to "associate" and/or "associating" may include tagging, flagging, correlating, using a look-up table or any other method or system for indicating or creating a relationship between elements. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

As used herein, big data may refer to partially or fully structured, semi-structured, or unstructured data sets including millions of rows and hundreds of thousands of columns. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "e-book," an "e-magazine," an application or micro-application, an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the processing methods described herein are implemented using the various particular devices and apparatuses described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present devices, apparatus and system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g., APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct other communications or germ mapping. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL)

and Transport Layer Security (TLS). A web client may implement several application layer protocols including http, https, ftp, and sftp.

In various embodiments, components, modules, and/or engines of a system may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk®, IP-6, NetBIOS®, OSI, any tunneling protocol (e.g., IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual data elements and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the user, healthcare entity, patient account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the various entities involved. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on a device along with the associated data, but instead the appropriate action may be taken by providing to the user at the standalone device, the appropriate option for the action to be taken. The system may contemplate a data storage arrangement wherein the header or trailer, or header or trailer history, of the data is stored on the system, device or app in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available, e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Data or operations originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix My SQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CS S), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VB Script or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The devices, apparatus, process and system is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for an apparatus or component of an apparatus, or method in using an apparatus to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

The invention claimed is:

1. A printhead device configured for use in a multi-material 3D printing apparatus, the printhead device comprising:
   a plurality of structural spacers;
   a plurality of sections, each of the plurality of sections separated from an adjacent one of the plurality of sections by one of the plurality of structural spacers, the plurality of sections comprising:
      a coating section comprising a top surface having at least one opening configured to dispense a liquid resin therefrom when the liquid resin is placed under fluidic pressure;

a curing section spaced apart and distinct from the coating section, the curing section comprising a top surface that is transparent to at least one of UV, infrared or visible light; and a cleaning section spaced apart and distinct from the coating section and the curing section, the cleaning section comprising a top surface having at least one opening configured to intake the liquid resin when the at least one opening is placed under vacuum.

2. The printhead device of claim 1, wherein the plurality of sections further comprises a post-curing section spaced apart and distinct from the coating section, the curing section, and the cleaning section, the post-curing section comprising a top surface that is transparent to at least one of UV light, infrared light, or visible light.

3. The printhead device of claim 1, wherein the top surface of the coating section comprises a plurality of holes, each of the plurality of holes configured to dispense the liquid resin therefrom when the liquid resin is placed under fluidic pressure.

4. The printhead device of claim 3, wherein each of the plurality of holes measures about 0.5 mm$^2$ in open area with each of the plurality of holes uniformly spaced apart from an adjacent one of the plurality of holes.

5. The printhead device of claim 3, wherein each of the plurality of holes is configured to exude the liquid resin to a height when the liquid resin is placed under fluidic pressure, the height measured from the top surface of the coating section, the height being from about 0.05 mm to about 1.5 mm.

6. The printhead device of claim 3, wherein the coating section further comprises a reservoir configured to contain the liquid resin placed under fluidic pressure.

7. The printhead device of claim 1, wherein the top surface of the cleaning section comprises at least one elongated vacuum slot.

8. The printhead device of claim 7, wherein the top surface of the cleaning section comprises two or more elongated and parallel configured vacuum slots having sequentially narrowing widths.

9. The printhead device of claim 1, wherein the top surface of the coating section, the top surface of the curing section, and the top surface of the cleaning section are coplanar.

10. An apparatus for multi-material 3D printing of an object, the apparatus comprising:

at least one printhead device configured to move along an x-axis, wherein each of the at least one printhead device comprises a coating section comprising a top surface having at least one opening configured to dispense a curable material therefrom when the curable material is placed under fluidic pressure; a curing section comprising a top surface that is transparent to at least one of UV, infrared or visible light; and a cleaning section comprising a top surface having at least one opening configured to intake the curable material when the at least one opening is placed under a reduced pressure, wherein:

each of the at least one printhead device further comprises:
a plurality of structural spacers; and
a plurality of sections, each of the plurality of sections separated from an adjacent one of the plurality of sections by one of the plurality of structural spacers, the plurality of sections comprising the coating section, the curing section, and the cleaning section;

a build platform configured to move the object being printed in a z-direction towards and away from the at least one printhead device;

a light source configured to project through the at least one printhead device and cure the curable material applied to the build platform or to the object being printed; and a computing unit comprising a non-transitory computer-readable medium encoded with program instructions for controlling the at least one printhead device, the build platform, and the light source, the computing unit configured to:

deposit, via the at least one printhead device, a layer of the curable material to the build platform or onto a layer of cured material on the object being printed to form a deposited layer, and subsequently photo cure, by a curing step, via the light source, and through the at least one printhead device, a portion of the deposited layer according to a projected image pattern formed by projecting a masked image to the curing section of the at least one printhead device.

11. The apparatus of claim 10, wherein the light source is part of an optics system controlled by the program instructions.

12. The apparatus of claim 11, wherein the optics system comprises a digital micromirror device (DMD), a liquid crystal display, or a scanning-mirror-based laser, controlled by the program instructions.

13. The apparatus of claim 10, wherein the computing unit is further configured to control a bottom-up or top-down, deposition-on-demand (DOD), layer-by-layer stereolithographic printing of the object with the curable material.

14. The apparatus of claim 13, wherein each of the at least one printhead device is configured for:

cleaning off remaining uncured material on the object by a vacuum-cleaning process, after the curing step.

15. The apparatus of claim 10, wherein each of the at least one printhead device further comprises a post-cure section comprising a top surface transparent to at least one of UV light, infrared light, or visible light.

16. The apparatus of claim 10, wherein at least two printhead devices are mounted on a multistage platform configured for movement of the at least two printhead devices in unison, wherein the movement is controlled by the program instructions, and wherein the movement comprises registration of each of one of the coating section, the curing section, and the cleaning section of each of the at least two printhead devices underneath the object being printed.

17. The apparatus of claim 10, further comprising a fluidic pump connected to each of the at least one printhead device, configured to provide the curable material under pressure to the at least one opening configured in the top of the coating section of each of the at least one printhead device, wherein the fluidic pump is controlled by the program instructions.

18. The apparatus of claim 10, further comprising a vacuum source connected to the at least one opening configured in the top of the cleaning section of each of the at least one printhead device, configured to place the at least one opening under a reduced air pressure, wherein the vacuum source is controlled by the program instructions.

19. The apparatus of claim 10, wherein the top surface of the coating section, the top surface of the curing section, and the top surface of the cleaning section are coplanar.

20. The apparatus of claim 10, wherein the top surface of the coating section and the top surface of the curing section are coplanar top surfaces and offset from the top surface of the cleaning section such that the coplanar top surfaces of the coating section and the curing section are configured closer to the build platform by up to about 2 mm than the top surface of the cleaning section.

21. The apparatus of claim 10, wherein the computing unit is further configured to:
   clean off, by a cleaning step and via the at least one printhead device, a remaining uncured material on the object by a vacuum-cleaning process, after the curing step, and
   post-curing, via the at least one printhead device and through a second light source, any of the remaining uncured material that is remaining after the cleaning step.

* * * * *